United States Patent
Osder et al.

(10) Patent No.: US 6,885,917 B2
(45) Date of Patent: Apr. 26, 2005

(54) ENHANCED FLIGHT CONTROL SYSTEMS AND METHODS FOR A JET POWERED TRI-MODE AIRCRAFT

(75) Inventors: Stephen S. Osder, Scottsdale, AZ (US); Thomas L. Thompson, Mesa, AZ (US)

(73) Assignee: The Boeing Company, Mesa, AZ (US)

( * ) Notice: Subject to any disclaimer, the term of this patent is extended or adjusted under 35 U.S.C. 154(b) by 341 days.

(21) Appl. No.: 10/289,739

(22) Filed: Nov. 7, 2002

(65) Prior Publication Data

US 2004/0093130 A1 May 13, 2004

(51) Int. Cl.[7] .............................. G06F 19/00; G06F 7/00
(52) U.S. Cl. .............................. 701/3; 244/175; 244/10; 244/7 R; 244/7 A; 244/6; 244/12.3
(58) Field of Search ..................... 701/3, 4; 244/175, 244/10, 7 R, 7 A, 6, 12.3

(56) References Cited

U.S. PATENT DOCUMENTS

| | | |
|---|---|---|
| 3,159,360 A | 12/1964 | Ryan et al. |
| 3,603,697 A | 9/1971 | Lane |
| 3,794,273 A | 2/1974 | Girard |
| 4,420,808 A | 12/1983 | Diamond et al. |
| 4,589,611 A | 5/1986 | Ramme et al. |
| 4,675,827 A | 6/1987 | Narita et al. |
| 4,807,129 A | 2/1989 | Perks |
| 4,947,334 A | 8/1990 | Massey et al. |
| 4,965,879 A | 10/1990 | Fischer, Jr. |
| 4,967,363 A | 10/1990 | Bonafe |
| 4,979,696 A | 12/1990 | Yff |
| 4,980,835 A | 12/1990 | Lawrence et al. |
| 5,001,646 A | 3/1991 | Caldwell et al. |
| 5,224,664 A | 7/1993 | Adams, Sr. et al. |
| 5,265,826 A | 11/1993 | Ebert et al. |
| 5,265,827 A | 11/1993 | Gerhardt |
| 5,274,558 A | 12/1993 | High et al. |
| 5,314,147 A | 5/1994 | Ebert et al. |
| 5,331,559 A | 7/1994 | High et al. |
| 5,454,530 A | 10/1995 | Rutherford et al. |
| 5,516,060 A | 5/1996 | McDonnell |
| 5,788,181 A | 8/1998 | Wilson |
| 5,850,615 A | 12/1998 | Osder |
| 5,951,608 A | 9/1999 | Osder |
| 6,193,464 B1 | 2/2001 | Nyhus et al. |
| 6,622,962 B1 * | 9/2003 | White .......................... 244/7 R |
| 6,669,137 B1 * | 12/2003 | Chen ........................... 244/7 R |
| 2004/0056144 A1 * | 3/2004 | Bass et al. ..................... 244/10 |

* cited by examiner

*Primary Examiner*—Thomas G. Black
*Assistant Examiner*—Ronnie Mancho
(74) *Attorney, Agent, or Firm*—Stout, Uxa, Buyan & Mullins, LLP; Donald E. Stout

(57) ABSTRACT

A method of stabilizing a jet-powered tri-mode aircraft as the aircraft travels in a helicopter mode, a compound mode, and a fixed-wing mode is disclosed. The method includes receiving a plurality of velocity vector component values and velocity vector commands derived from either (1) a number of pilot operated controllers or (2) a commanded array of waypoints, which are used for fully automated flights, and a rotor speed reference value, which is decreased with increasing forward speed to unload the rotor, thereby permitting conditions for stopping the rotor in flight. Stabilization of the commanded velocity vector is achieved in all modes of flight using blended combinations of rotor swashplate controls and aerodynamic controls such as elevons, canards, rudders, and a horizontal tail. Stabilization to the commanded velocity vector includes a plurality of control constraints applied to the pilot stick controllers that prevent penetration of envelope limits.

49 Claims, 18 Drawing Sheets

Fig. 16

$V_0$ = Velocity at Flare Engage
$\dot{H}_0$ = Vertical Rate at Flare
$VDOT_{Cmd.} = g/V_0 \dot{H}_0$ $H_{Flare} = -K_t \dot{H}_0$
$K_t = 2$ to $3$ ktht = 1.0 to 2.0 kvx = +0.5 (displ.)
kvix = +0.1 (integral)

-57.3/g
-57.3/g $V_{Ref} = 60K$

KQ = 4
KQI = 4 initialize = 0

1600, 1601, 1602

ENHANCED FLIGHT CONTROL SYSTEMS AND METHODS FOR A JET POWERED TRI-MODE AIRCRAFT

BACKGROUND OF THE INVENTION

1. Field of the Invention

The present invention relates generally to an aircraft, and more particularly to enhanced flight control systems and methods for a jet powered tri-mode aircraft.

2. Description of the Related Art

U.S. Pat. No. 5,951,608 to Osder, entitled "Flight Control System For Jet Powered Tri-Mode Aircraft," which is assigned to the assignee of the present invention, discloses a basic flight control system for a jet-powered tri-mode aircraft. The disclosure of the '608 patent is incorporated by reference herein. The jet-powered tri-mode aircraft generally has three primary modes of operation, which are a helicopter mode, a compound mode, and a fixed-wing mode. The jet-powered tri-mode aircraft is designed to take off vertically in helicopter mode and then to fly horizontally in fixed-wing mode.

In the helicopter mode, power is applied to a rotor blade of the aircraft so that the aircraft can take off in a vertical direction. The rotating rotor blade provides the advantage of small space takeoffs and landings. In the helicopter mode, the forward speed of the aircraft is controlled by tilting the rotor generated thrust vector forward or aft. Initially, most of the available power is applied to the rotor blade, and the rotor blade provides most of the aircraft's maneuverability and control. Control of the aircraft is augmented by the aero surfaces (e.g., the elevons and horizontal tail surfaces) due to the rotor downwash enhancing the effectiveness of the aero surfaces at low traveling velocities. The rotor tip jets eliminate the need for an anti-torque system such as a tail rotor or equivalent. However, differential left and right thrusters are used to obtain yaw control. These and other features are disclosed in detail in the '608 patent.

In the compound mode, the rotor blade is gradually unloaded until it provides essentially zero lift. Complete unloading occurs at a predetermined velocity, sometimes referred to as the conversion speed. In the compound mode, the forward speed of the aircraft is maintained by applying power to the conventional jet engine to direct the engine exhaust in the rear direction. The aero surfaces provide most of the aircraft's maneuverability and control at higher speeds of the compound mode. The rotor swashplate controls are blended with the elevons, the rudder, and the horizontal tail aerodynamic controls, with the aerodynamic surface controls becoming dominant at the higher speeds while the rotor swashplate controls have their gains gradually reduced to near zero at higher speeds of the compound mode. The canard is also articulated, so that combined with the horizontal tail, these aero surfaces provide all of the aircraft's lift at the conversion speed. Once all of the aircraft's weight is supported by the lift generated by the aero surfaces, the rotor blade is rapidly stopped and locked in place and the aircraft operates in the fixed-wing mode. Further details regarding the technique to stop and re-start the rotor blade are disclosed in, for example, U.S. Pat. No. 6,193,464 to Nyhus and Osder, entitled "Active Brake Control For Rotor/Wing Aircraft," which is assigned to the assignee of the present invention.

In the fixed-wing mode, the aero surfaces and the locked rotor blade provide all of the aircraft's lift. The canard and the horizontal tail positions are aligned to allow the aircraft to more efficiently travel at high speeds. To control the aircraft, the basic aircraft stabilization and control concept is implemented and is based on commanding the desired aircraft velocity vector. The velocity vector control is used to provide the integrated flight path and rotor speed control of the aircraft in all of the flight modes. The basic aircraft stabilization and control concept using the desired aircraft velocity vector is disclosed in, for example, U.S. Pat. No. 5,001,646 to Caldwell and Osder, entitled "Automated Helicopter Flight Control System," which is assigned to the assignee of the present invention.

To integrate the propulsion control and the flight control of the aircraft in the compound mode, the '608 patent disclosed a method of controlling rotor speed via modulation of the collective position. In addition, the '608 patent disclosed a diverter valve to split the engine exhaust between the rotor tip jets and the cruise nozzle. When the aircraft is hovering and at low helicopter speeds, all the engine exhaust flows to the rotor tip jets. As the aircraft moves through the compound mode, the diverter valve decreases flow to the rotor tip jets and increases flow to the cruise nozzle. Once the aircraft has completely transitioned to the fixed-wing mode, the diverter valve is closed to the rotor tip jets and is open to the cruise nozzle.

One drawback of the '608 patent relates to the diverter valve being unable to adequately exit the engine exhaust during the compound mode causing the engine to experience a choke condition, thus resulting in the engine stalling. The problem is fatally intolerable for an aircraft. Another drawback of the '608 patent is the difficulty in determining and maintaining the flight envelope for jet-powered tri-mode aircraft. This is because the flight envelope for multi-flight mode aircrafts is different depending on the flight mode. For example, the flight path and the maximum aircraft speed differ when in the helicopter mode compared to the fixed-wing mode. Also, when in the compound mode, the flight envelope will be different depending on the extent of the unloading of the rotor blade.

SUMMARY OF THE INVENTION

One embodiment of the present invention includes a jet-powered tri-mode aircraft capable of automatically transitioning from a helicopter mode to a compound mode to a fixed-wing mode without any intervention by a pilot of the aircraft. The aircraft includes a fuselage, a turbofan engine mounted within the fuselage for producing an airflow, and a rotor blade having a plurality of exit nozzles for outputting the airflow. The aircraft also includes a mast valve for regulating the airflow to the plurality of exit nozzles of the rotor blade, a cruise nozzle for regulating and outputting the airflow, and a scheduler for scheduling the mast valve and the cruise nozzle as a function of aircraft speed and for monitoring the airflow being output from the plurality of rotor blade exit nozzles, the cruise nozzle, the mast valve, and the lateral thrusters to prevent the turbofan engine from stalling.

Another embodiment of the present invention includes a method of stabilizing a jet-powered tri-mode aircraft as the jet-powered tri-mode aircraft travels in a compound mode, which is between a helicopter mode and a fixed-wing mode. The method of stabilizing a jet-powered tri-mode aircraft includes receiving a plurality of velocity vector component values and velocity vector commands derived from either (1) a number of pilot operated controllers or (2) a commanded array of waypoints, which are used for fully automated flights, and a rotor speed reference value, which is decreased with increasing forward speed to unload the rotor, thereby permitting conditions for stopping the rotor in flight. Stabilization of the commanded velocity vector is achieved in all modes of flight using blended combinations of rotor swashplate controls and aerodynamic controls such as elevons, canards, rudders, and a horizontal tail. A turbofan engine is used to drive the rotor and to attain forward propulsion, with engine controls, including active stall margin control integrated with the flight controls. In support of the stabilization, scheduled mast valve and cruise nozzle direct the engine thrust to the rotor or to the conventional exhaust for forward propulsion, while the canard and horizontal tail surfaces are scheduled to assume aircraft lift as the rotor is unloaded. Constant flying qualities are provided in all three modes of flight without requiring conventional throttle levers or collective controls. Stabilization to the commanded velocity vector includes a plurality of control constraints applied to the pilot stick controllers that prevent penetration of envelope limits.

Another embodiment of the present invention includes a method for scheduling canard positions and horizontal tail positions of a jet-powered tri-mode aircraft as a function of the speed of the aircraft to achieve smooth unloading of a rotor blade of the aircraft. The method combines closed loop control (stabilization) of the aircraft pitch attitude with the open loop control (scheduling) of the horizontal tail. The closed loop control uses a q dot (pitch angular acceleration) command, which is effectively a pitch moment command having a low frequency component and a high frequency component. The elevon position is determined by the high frequency component and the horizontal tail position is determined by the sum of the open loop control and the low frequency component. The frequency at which the closed loop control is split between the horizontal tail and the elevon is determined by the proximity of the horizontal tail to its physical position limit. As the horizontal tail approaches its position limit, the frequency split value changes so that the elevon assumes more of the low frequency controls. If the horizontal tail is at its position limit, the horizontal tail can no longer provide any of the closed loop control, but the adjustable frequency splitting value now allows the elevons to provide control at all frequencies while the horizontal tail holds a fixed position.

Another embodiment of the present invention includes a method for performing an automatic autorotation of a rotor blade of a jet-powered tri-mode aircraft in the event of an engine failure. The method includes setting a horizontal speed reference for the aircraft during its descent using modulation of pitch attitude to maintain the horizontal speed reference, using collective position modulation to help maintain rotor speed, computing an optimum flare altitude using an acceptable vertical acceleration, and setting a reduction in the vertical speed reference starting at the flare altitude, and defining a forward speed deceleration that results in an appropriate angle of attack of the rotor blade to minimize rotor speed decay during the flare maneuver.

One advantage of the present invention is that undesirable or excessive flapping of the rotor blade is minimized during the helicopter mode. Another advantage is that speed of the aircraft is controlled without a separate throttle lever, thus simplifying the operations of the aircraft. The present invention provides an intelligent deployment schedule for the mast valve, cruise nozzle, canard, horizontal tail, and rotor blade speed reference that increases the flight envelope during the compound mode. The mast valve and the cruise nozzle can be separately scheduled to provide optimal exit areas for the jet engine, thus preventing the engine stall condition that exists when using the single diverter valve of the '608 patent. The present invention modifies the basic aircraft stabilization and control concept to enhance the aircraft's handling, maneuverability, and safety. The present invention adds several features to the velocity vector control.

The present invention, together with additional features and advantages thereof, may best be understood by reference to the following description taken in connection with the accompanying illustrative drawings.

BRIEF DESCRIPTION OF THE DRAWINGS

A system and method that implements the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

FIG. 16 is a simplified block diagram illustrating a pitch axis control loop 1600 for automatic autorotation of the rotor blade in the event of engine failure;

DETAILED DESCRIPTION OF THE PREFERRED EMBODIMENTS

Figure 1:
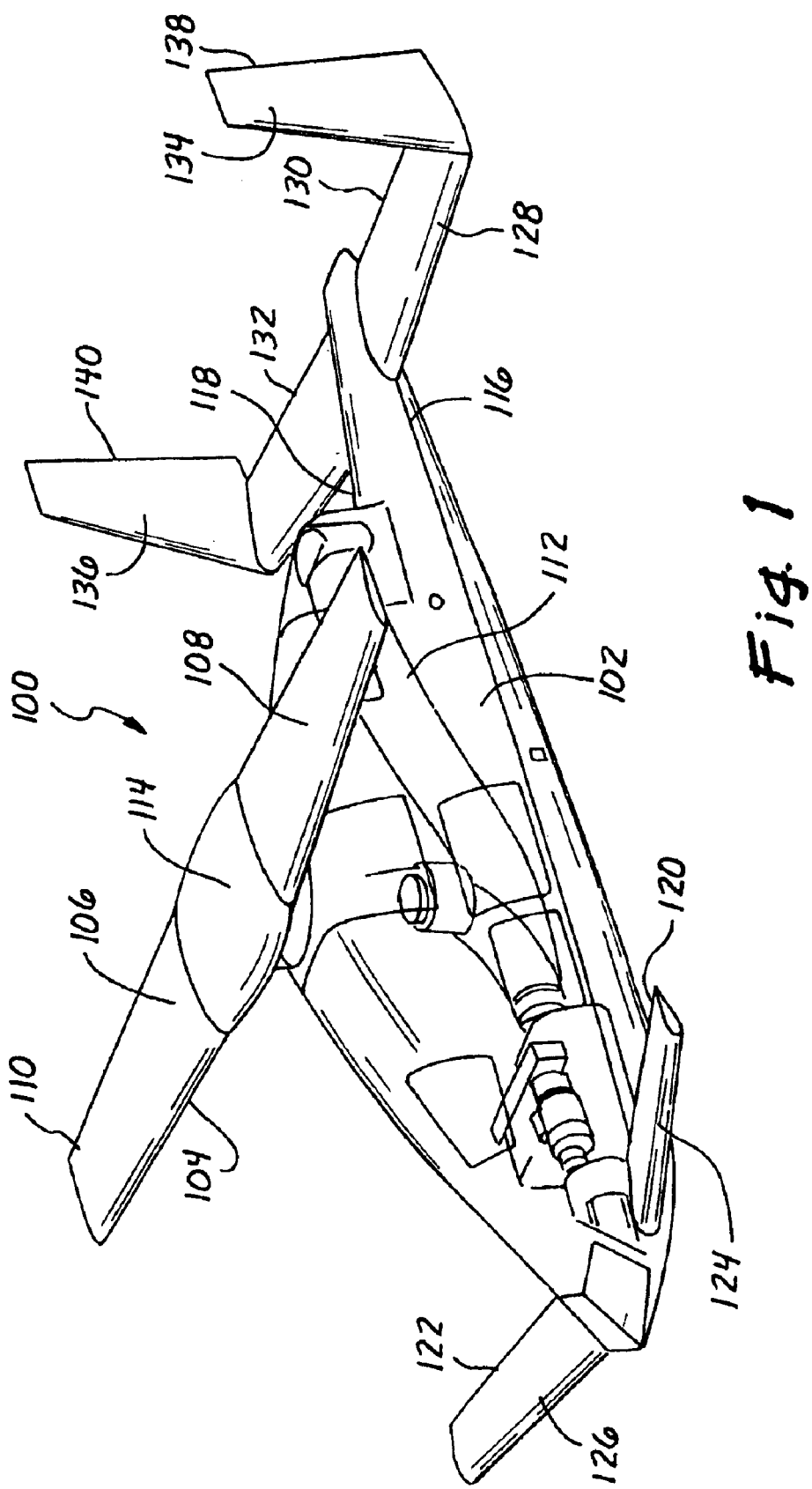
FIG. 1 is a perspective view of a jet-powered tri-mode aircraft according to the present invention.

Referring now more particularly to the drawings, FIG. 1 is a perspective view of a jet-powered tri-mode aircraft 100 according to the present invention. The aircraft 100 provides several advantages, enhancements, and improvements over the '608 patent. From reviewing this disclosure, the advantages, enhancements, and improvements will be apparent to one of ordinary skill in the art.

The aircraft 100 includes a fuselage 102 and a rotor blade 104 mounted thereon. The rotor blade 104 contains flow ducts 106 and 108, which eliminate the need for an anti-torque system such as a tail rotor or an equivalent structure. Each of the flow ducts 106, 108 serve to transport engine exhaust from the engine to exit nozzles 110, 112 located at the tips of the rotor blade 104. The engine exhaust from the flow ducts 106, 108 spins the rotor blade 104 about the rotor hub 114. The rotor blade 104 preferably comprises symmetrical leading and trailing edges. In the helicopter mode, the front edge of the right side of the rotor blade 104 leads, and the rear edge of the left side of the rotor blade 104 leads. Thus, the symmetrical leading and trailing edges of the rotor blade 104 provides for effective operations irrespective of airflow direction. The rotor swashplate controls are located below the center of the rotor blade 104. A left thruster 116 located on the left rear portion of the fuselage 102 provides yaw control, as does a right thruster 118 located on the right rear portion of the fuselage 102.

The aircraft 100 also includes canard flaps 120, 122 of the left and right canard wings 124, 126 to obtain maximum lift during low-speed flight, as the aircraft traveling velocity increases above approximately 60 knots. The canard wings 124, 126, which are articulated, are rotated to increase their angle of attack. Furthermore, the aircraft 100 includes a horizontal tail 128 having two elevons 130, 132, and two vertical tails 134, 136 where each vertical tail is attached to opposite ends of the horizontal tail 128. Each vertical tail 134, 136 has a rudder 138, 140. The canard wings 124, 126 gain lift with velocity, as does the horizontal tail 128, which is also articulated. Further details regarding the general structure shown in FIG. 1 are described in, for example, U.S. Pat. No. 5,454,530 to Rutherford, et al., entitled "Canard Rotor/Wing," which is assigned to the assignee of the present invention. The disclosure of this patent is incorporated by reference herein.

Figure 2:
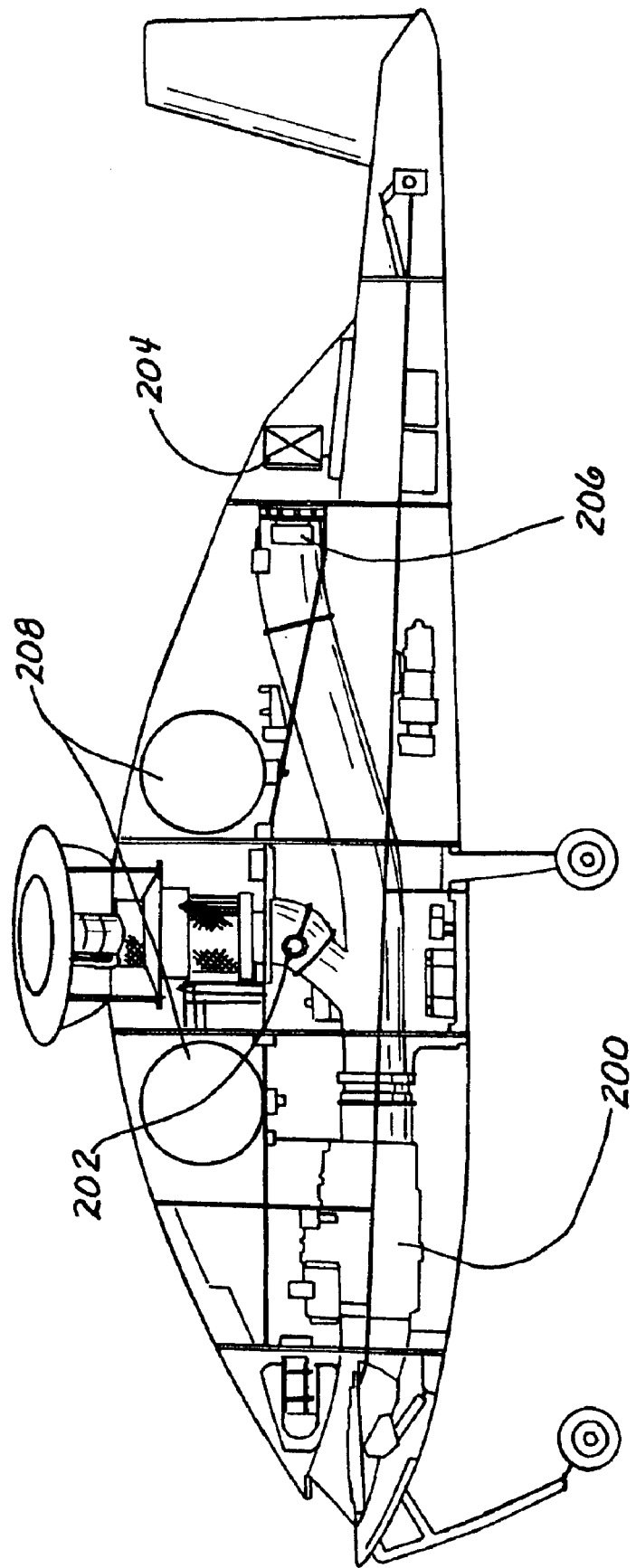
FIG. 2 is a left side view of the jet-powered tri-mode aircraft of FIG. 1 with a transparent shell to show its internal components.

FIG. 2 is a left side view of the jet-powered tri-mode aircraft of FIG. 1 with a transparent shell to show its internal components. The aircraft 100 has a turbo fan engine 200, a mast valve 202, a cruise nozzle 204, a directional control nozzle 206, and fuel tanks 208. The combination of the articulated mast valve 202 and cruise nozzle 204 assures that the engine exhaust has adequate exit areas during the compound mode. In addition, the aircraft 100 has an active engine stall control to assure that if the exit areas provided to the engine as a result of the mast valve and the cruise nozzle positions are not adequate for the desired stall margins, a means for independent exit area modulation is provided. The means may involve modulating the positions of the lateral thrusters 116, 118.

Figure 3:
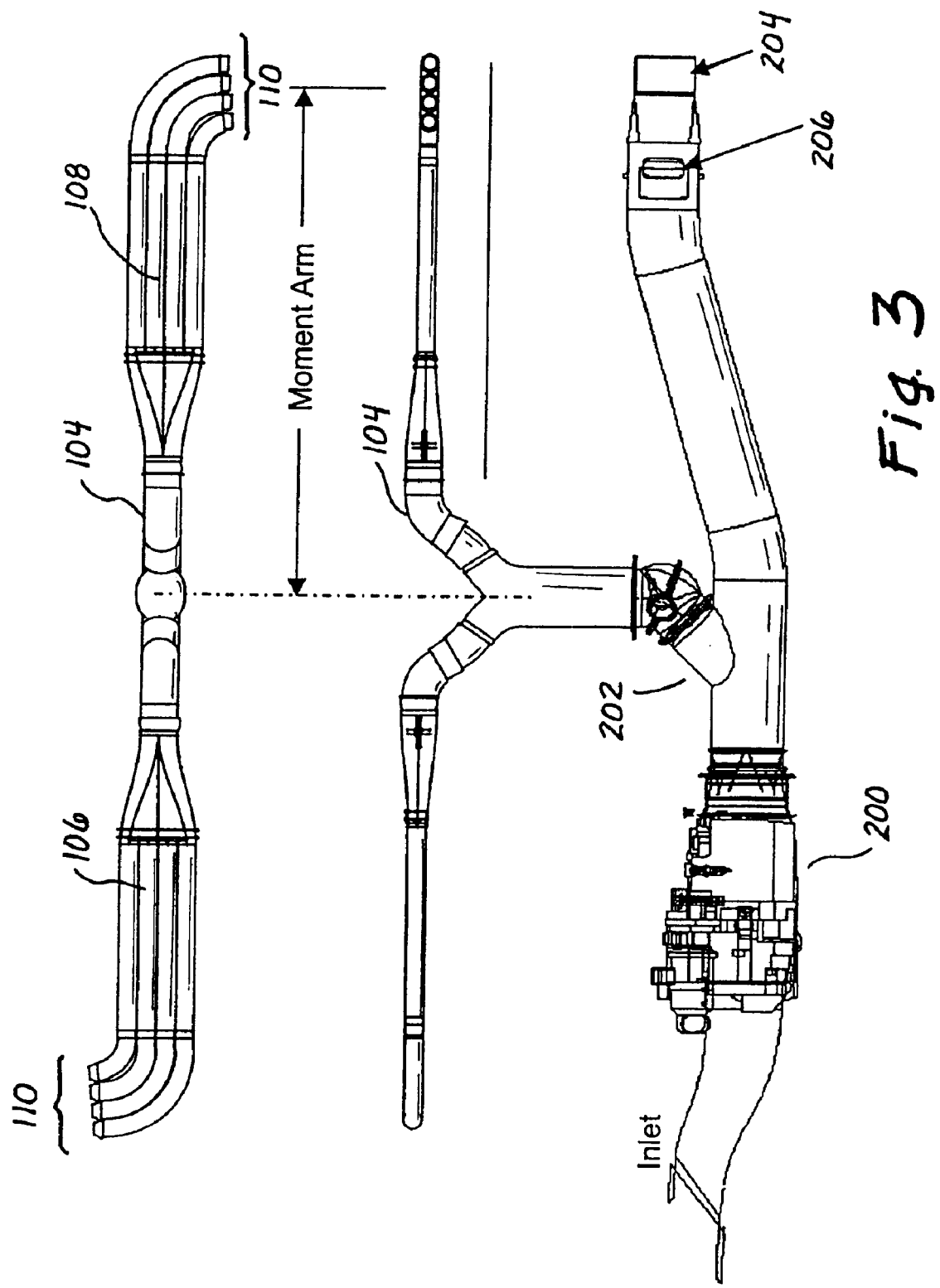
FIG. 3 is a left side view of the internal components of the jet-powered tri-mode aircraft of FIG. 2.

FIG. 3 is a left side view of the internal components of the jet-powered tri-mode aircraft of FIG. 2. The tip jet moment arm and the product of the tip jet force is equal to the moment that drives the rotor blade.

Figure 4:
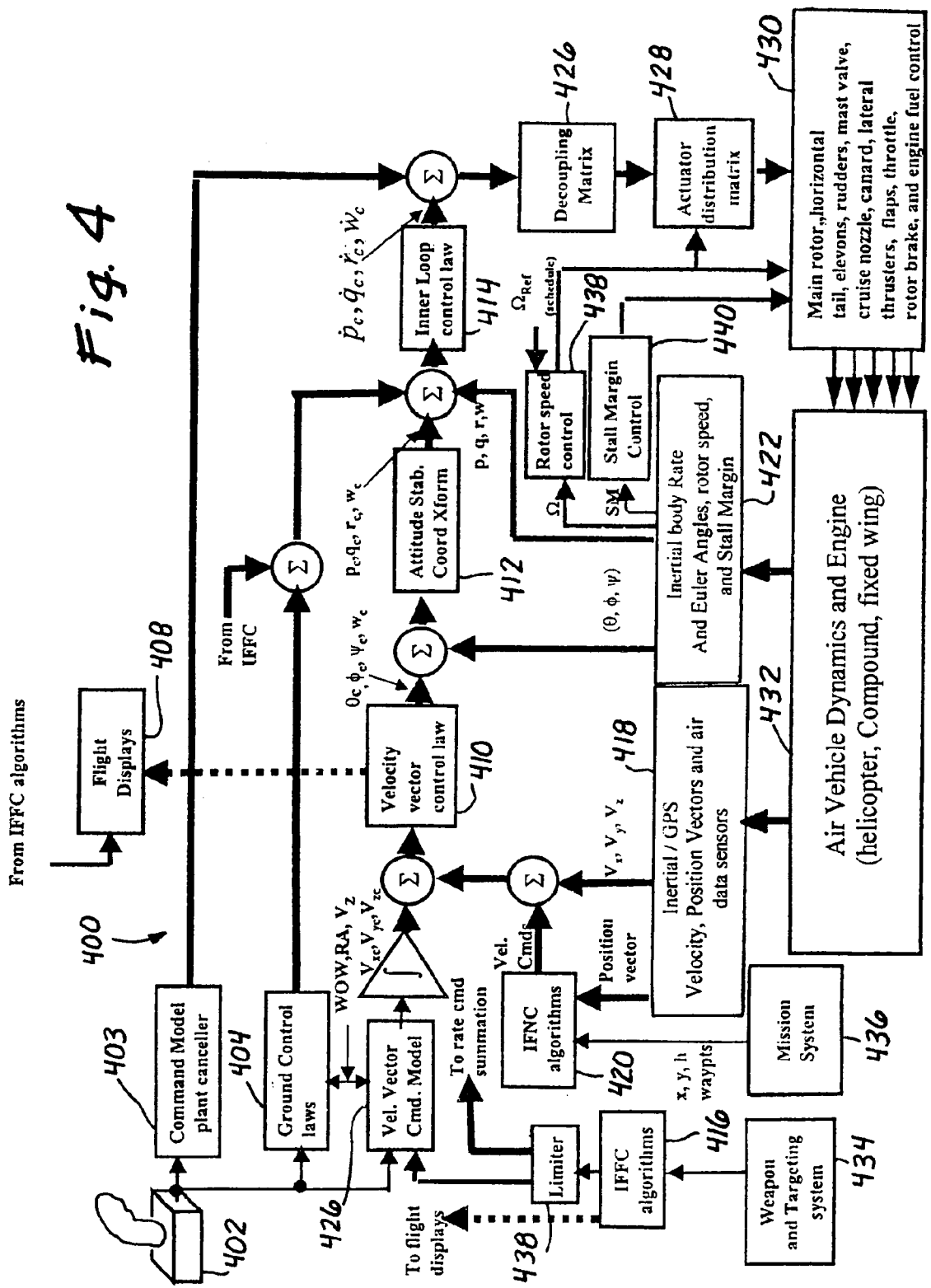
FIG. 4 is a general control block diagram of the canard rotor/wing integrated and propulsion flight control system of the present invention.

FIG. 4 is a general control block diagram of the canard rotor/wing integrated flight and propulsion control system 400 of the present invention. The flight control system 400 performs the stabilization to the reference velocity vector and the movement of control from the guidance modes to the piloted modes. The guidance modes provide fully autonomous mission control. The piloted modes allow control of the aircraft 100 when the pilot is on-board as well as when the pilot is remotely located. For example, a remotely located pilot can control an unmanned version of the aircraft 100 by inputting or programming the reference velocity vector to control and maneuver the aircraft 100 in a semi-autonomous mode. The semi-autonomous mode continuously stabilizes the reference velocity vector, which uses control inner loops 414 to issue force and moment commands to the rotor controls, the elevon controls, the rudder controls, the throttle controls (e.g., engine fuel controller), and the differential lateral thrusters 116, 118. Flight envelope constraints can be input into the pilot's acceleration command inputs to impose limits on the control gradients of the stick commands to prevent the aircraft 100 from penetrating into an unsafe forward velocity, side velocity or vertical velocity.

The velocity vector commands 406 are issued from the fully autonomous mode or the semi-autonomous mode. In the fully autonomous mode, the velocity vector commands 406 are derived from the position vector errors where the guidance is based on an array of position vector waypoints in 3 dimensions. In the semi-autonomous mode, the pilot's velocity vector acceleration commands are input via the stick commands 402. The acceleration commands are integrated into the velocity vector control laws 410 to produce velocity commands, which are analogous to the velocity vector commands 406 used in the fully autonomous mode. Therefore, the velocity vector control laws 410 can receive inputs from either the pilot's input or the waypoint inputs without any significant control law adaptations.

With a contemporary mission computer, the position vector is input into an automatic guidance function of the integrated flight and navigation control (IFNC) algorithms 420. The IFNC algorithms 420 compute the errors from the desired position waypoints and use the errors to command velocity vector corrections by producing and outputting velocity commands. The actual measured velocities are measured using the inertial/GPS block 418. The difference between the velocity commands and the actual measured velocities ($V_x$, $V_y$, $V_z$) are the velocity errors, which are applied to the attitude stabilization coordinate transformation block 412 via the velocity vector control law block 410. Further details regarding the attitude stabilization coordinate transformation block 412 are disclosed in the '608 patent and the '646 patent. The stick commands 402, generated by the control stick, are 3-axis acceleration commands that are applied to integrators, which output velocity commands and a yaw axis rate command that provides for heading changes. When the actual measured velocities are summed with either the manually or automatically generated velocity commands, the velocity errors are obtained and applied to the velocity vector control law block 410. The velocity vector control law block 410 generates the pitch attitude commands $\theta_{cmd}$, the roll attitude commands $\phi_{cmd}$, the heading commands $\psi_{cmd}$, and the w dot commands (body axis vertical acceleration) to reduce the velocity errors to zero. The inner loop control law block 414 generates angular and linear acceleration commands $p_{cmd\ dot}$, $q_{cmd\ dot}$, $r_{cmd\ dot}$, $w_{cmd\ dot}$, where p is the roll rate, q is the pitch rate, r is the yaw rate, and w dot is the body axis vertical acceleration.

The intelligent scheduling and closed loop control actuation block 430 provides position and deployment schedule commands to the engine throttle (e.g., fuel control), the rotor blade's speed reference, the rotor brake (activated during rotor stopping), the canard flaps 120, 122, the left and right canard wings 124, 126, the horizontal tail 128, the elevons 130, 132, the rudders 138, 140, the turbo fan engine 200, the mast valve 202, the cruise nozzle 204, and the directional control nozzle 206. For example, the intelligent scheduling block 430 provides an intelligent deployment schedule for the canard wings 124, 126 and the horizontal tail 128 to increase the flight envelope during the compound mode and to minimize the flapping of the rotor blade 104 during the helicopter mode. In addition, the canard wings 124, 126 and the horizontal tail 128 can be aligned with the rotor downwash to minimize the adverse loss of rotor lift due to the impingement of the rotor downwash on these surfaces during helicopter mode hover. The rudders 138, 140 are scheduled as a function of aircraft speed to minimize the sidewash flow from the rotor blade 104, thus minimizing the need to fly with sideslip. The intelligent deployment schedules for the horizontal tail 128 and the rudders 138, 140 can be augmented by the closed loop controls that provide aircraft stabilization. In particular, the scheduling of the horizontal stabilizer position at low helicopter speeds contributes to the off-loading of much of the pitch trim control from rotor flapping to horizontal tail control to reduce the amount of rotor flapping needed to maintain pitch control.

The intelligent scheduling block 430 provides position and deployment schedule commands to the mast valve 202 and the cruise nozzle 204 to compensate for adverse coupling effects of the rotor speed control with the flight path control and with the aircraft's forward speed control. Compensating for the adverse coupling effects is accomplished by scheduling the positions of the mast valve 202 and the cruise nozzle 204 as a function of both forward and vertical speed commands. The forward and vertical speed commands are generated by the stick commands 402 associated with the velocity vector control mode. When the aircraft 100 has been commanded to descend, the mast valve 202 is increased for a given forward speed, which requires the equilibrium value of collective control to be increased. This increases the rotor speed control authority, thereby preventing bottoming of the collective control. If the collective control bottoms, the adverse coupling between the flight path and the forward speed control loops occurs and the rotor speed can be reduced drastically below minimum limits.

Figure 5:
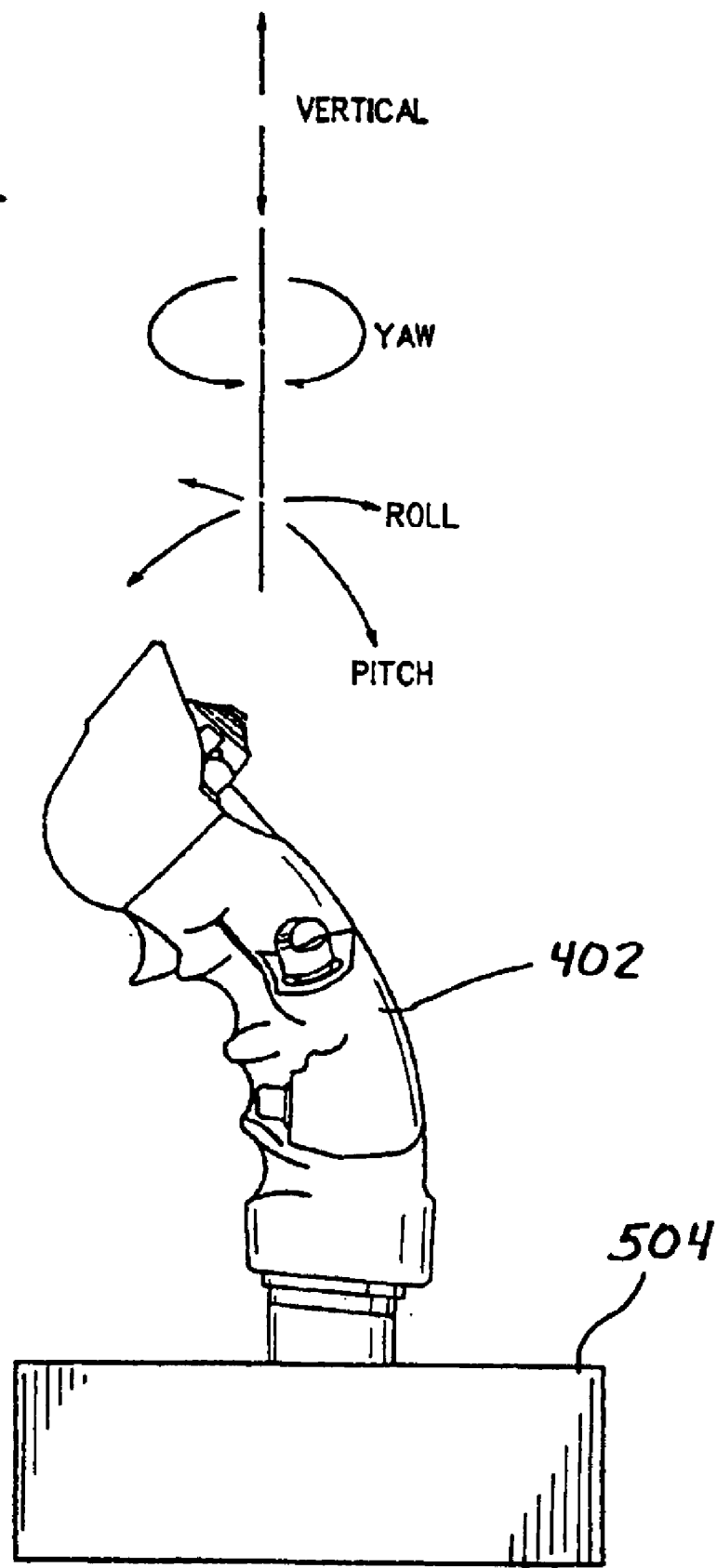
FIG. 5 is a perspective view of the control stick, which can be utilized to affect stick commands to the integrated and propulsion flight control system of the present invention.

FIG. 5 is a perspective view of the control stick 402, which can be utilized to affect stick commands to the integrated flight and propulsion control system 400 of the present invention. The movement of the control stick 402 transmits commands to the integrated flight and propulsion control system 400. The indicated control movements shown are for vertical, yaw, pitch, and roll, and are indicated by the appropriate directional arrows. For example, the fore-aft positioning of the stick commands proportional forward accelerations and the up-down positioning of the vertical stick commands proportional vertical accelerations.

The control stick 402 is preferably a state of the art 3-axis or 4-axis sidestick controller. In one embodiment, the sidestick controller is an actively controlled control stick in which the stick forces or control gradients are continuously changing as a function of the aircraft's response to the pilot's control stick commands. For example, if the pilot's control stick commands instruct the aircraft 100 to penetrate the aircraft's envelope boundary, the control gradients will make adjustments to the commands so that the aircraft 100 will not penetrate the envelope boundary. This ensures that the safety limits of the aircraft 100 are maintained irrespective of the pilot's control stick commands. The envelope limits may be based on the structural features, performance attributes or power availability of the aircraft 100. The control stick 402 can be movably supported by a support 504.

Referring back to FIG. 4, a typical 4-axis sidestick controller is used for control of the aircraft 100 during all flight modes. Hence, the control stick 402 commands the desired aircraft state and the integrated flight and propulsion control system 400 determines which force and moment generating devices (e.g., swashplate and aero surfaces) are actuated. Therefore, control of the aircraft 100 is achieved using the control stick 402 without any separate throttle lever, thus simplifying control of the aircraft 100. The output of the decoupling matrix 426 into the actuator distribution matrix 428 is to ensure that the 3 angular acceleration and linear acceleration commands of the inner loop output produce the desired motions without the undesirable cross-coupling. For the forward acceleration controls, different force and moment generating devices are actuated by the integrated flight and propulsion control system 400 for the helicopter mode compared to the devices actuated in the compound mode or the fixed wing mode. Hence, the pilot experiences a consistent maneuver response in all flight modes.

A compensation block (see FIG. 10) includes a number of compensators that prevent adverse phase relationships between the vertical speed excursions and the forward speed excursions. The compensators provide consistent closed loop bandwidths for both vertical loops (via pitch modulation) and forward loops (via throttle) via the use of phase compensation in the throttle loop and via gain compensations as a function of control positions in the rotor speed control loop 1004.

A brief description of each mode of operation is discussed below.

Helicopter Mode of Operation

The helicopter mode of operation is when the aircraft 100 is traveling at a forward velocity of between 0 knots and 80 knots. Sometimes, the helicopter mode of operation can be divided into two sub-modes: a pure helicopter mode or low speed mode, which is when the aircraft 100 is traveling at a forward velocity of between 0 knots and 20 knots, and an augmented helicopter mode, which is when the aircraft 100 is traveling at a forward velocity of between 20 knots and 80 knots.

In the pure helicopter mode, the mast valve 202 is fully open and the cruise nozzle 204 is completely closed. The engine 200 is throttled to provide constant rotor speed. In order to prevent the engine 200 from stalling, the flight control system 400 includes an active stall margin control 440 that modulates the opening and closing of the thrusters 116, 118. The active stall margin control 440 computes an active stall margin from several measured variables including the instantaneous fan pressure ratio. The difference between the desired stall margin and the measured (estimated) stall margin generates a back pressure control command. The stall margin control (also referred to as the backpressure control) commands a rate of change of the effective exit area 206 seen by the engine 200. The directional control nozzle exit area regulates the engine backpressure. The rotor collective provides vertical flight path control and the rotor cyclic provides lateral and longitudinal velocity control via the inner loop 414 generated angular acceleration control.

In the augmented helicopter mode, the mast value 202 is fully open and the cruise nozzle 204 is partially open for auxiliary thrust. The engine 200 is throttled to provide constant rotor speed via closed loop control of the rotor speed error, which is the difference between the reference rotor speed and the actual measured rotor speed. The directional control nozzle 206 area regulates the engine backpressure. The canard wings 124, 126 and the horizontal tail 128 are scheduled to align with the downwash of the rotor blade 104. The elevons 130, 132, and rudders 138, 140 are activated. The rotor collective provides vertical flight path control and the rotor cyclic provides lateral and longitudinal moment controls as commanded by the inner loop 414.

In the hover and low speed helicopter mode of operation, the flight control system 400 aligns the canard wings 124, 126 and the horizontal tail 128 with the downwash flow of the rotor blade 104 to minimize the loss of rotor blade 104 lift due to the downwash flow of the rotor blade 104 on the surfaces of the canard wings 124, 126 and the horizontal tail 128. In addition, the flight control system 400 controls the rudders 138, 140 based on the aircraft traveling velocity to minimize the sideslip or yaw of the aircraft 100 due to the sidewash flow of the rotor blade 104 on the surfaces of the rudders 138, 140. Yaw control is accomplished with a blend of differential lateral thrusters 116, 118 and rudders 138, 140. The flight control system 400 includes a flight path control loop, which includes the velocity vector control law 410 and the attitude stabilization/coordinate transformation 412. The flight path control loop monitors and adjusts the positions of the canard wings 124, 126, the horizontal tail 128, and the rudders 138, 140 to ensure that the aircraft 100 maintains a stable flight path. The stable flight path, defined by the velocity vector components, is commanded from the pilot stick or guidance provided by the autonomous modes waypoint array.

During hovering and at low speeds, the canard 124, 126 and the horizontal tail 128 are positioned, via a schedule, primarily to maintain alignment with the rotor downwash flow, thereby minimizing the detraction from rotor lift as that flow impinges on these surfaces. As the aircraft 100 travels above about 20 to 30 knots, the position of the horizontal tail 128, which was previously scheduled with the canard schedule to align with the rotor downwash flow, now becomes a greater part of the closed loop attitude stabilization/ coordinate transformation 412, the inner loop control law 414, and the surface actuation contained in block 430. At these speeds, the position of the horizontal tail 128 is scheduled for maintaining optimum aircraft trim in conjunction with the canard 124, 126 schedule. The canard schedule is a function of airspeed, with the canard 124, 126 and horizontal tail 128 scheduled to increase their angle of attack and hence to assume a larger percentage of total lift. In addition to the horizontal tail 128 schedule or open loop positioning of the horizontal tail 128, the horizontal tail 128 positioning also becomes part of the closed loop attitude stabilization/coordinate transformation 412 and the inner loop control law 414.

The horizontal tail control law adds to the long term components of the pitch stabilization command, q dot command, which is shown as the pitch component of the inner loop control law 414. The components of the q dot command are split as a function of frequency so that the elevons 130, 132 assume the high frequency part of the control law and the horizontal tail 128 provides the low frequency components according to the equation below. The q dot command symbol is QDC. The high frequency part that goes to the elevons 130, 132 is $QDC_{Elevon}=QDC*(\tau s/\tau s+1)$ and the low frequency part that goes to the horizontal tail 128 is $QDC_{Tail}=QDC/(\tau s+1)$, where the time constant $\tau$ is variable and becomes infinite if the horizontal tail 128 reaches its position limit of about 50 degrees. If the position limit is reached, the low frequency part of the control law is assumed by the elevons 130, 132 so that the pitch control remains stable even though the horizontal tail 128 has reached its limit position. One way to split the desired frequency is to use the equation $\tau=4.5+(10/50-\delta_T)$, where $-\delta_T$ is the horizontal tail position, for computing the time constant when the horizontal tail position approaches 50 degrees. The aerodynamic controls via the elevons 130, 132 and the horizontal tail 128 minimize the trim moment required of the swashplate controls and hence minimize the amount of the rotor flapping, which is an important contribution to improving rotor blade fatigue life.

Compound Mode of Operation

The compound mode of operation is when the aircraft 100 is traveling at a forward velocity of between 60 to 80 knots and 140 knots. In the compound mode of operation, the flight control system 400 controls the rotor swashplate, canard wings 124, 126, elevons 130, 132, rudders 138, 140, and horizontal tail 128. The forward speed of the aircraft 100 is no longer maintained by tilting the rotor thrust vector forward or aft, as in the helicopter mode, but rather by directing an increasing amount of airflow from the engine 200 through the exit nozzle 204 and controlling the forward speed via the closed loop throttle control law (see also FIG. 10).

The mast value 202 is scheduled to close with increasing speed of the aircraft 100 and the cruise nozzle 204 is scheduled to open with increasing speed of the aircraft 100. When the aircraft 100 has been commanded to descend, the mast valve 202 is scheduled to partially open and the cruise nozzle 204 is scheduled to partially close. The scheduling of the mast valve 202 and the cruise nozzle 204 as a function of both the forward speed command and the vertical speed command enables the engine 200 to provide an adequate range of control for stable rotor speed. The forward speed command and the vertical speed command are generated by the stick commands 406 being associated with the velocity vector command. The rotor blade speed is now controlled by modulating the collective pitch, and that speed reference is scheduled to decrease with increasing speed of the aircraft 100. The engine back-pressure is regulated by the directional control nozzles 206, which are partially closed. The pitch attitude commands control the vertical flight path. The rotor swashplate control gains are reduced with increasing speed of the aircraft 100 and the aero surface gains are increased with increasing speed of the aircraft 100.

In addition, the canard wings 124, 126 and the horizontal tail 128 are scheduled to off-load the rotor blade 104 and to compensate for adverse coupling effects of the rotor speed control with the flight path control and with the aircraft's forward speed control. Off-loading of the rotor blade 104 can be predicted based on the canard 124, 126 deflection δC, horizontal tail 128 deflection δT, altitude, speed, and weight of the aircraft 100. In this embodiment, a final vernier adjustment is made to the canard deflection δC before the rotor blade 104 is stopped.

After the flight control system 400 determines that the canard deflection δC, horizontal tail deflection δT, and speed of the aircraft 100 are within an off-loading range, a final vernier correction of the surface lift is initiated by the pilot or remote controller. The flight control system 400 compares the instantaneous angle of attack α to a reference angle of attack $\alpha_{ref}$, which is the desired angle of attack. The desired angle of attack is determined by the altitude and weight of the aircraft 100. In one embodiment, the desired angle of attack is 0 degrees. If the instantaneous angle of attack a is greater than the reference angle of attack $\alpha_{ref}$, then the position of the canard wings 124, 126 is moved up at a slow and gradual rate causing the pitch attitude and instantaneous angle of attack α to decrease toward the desired angle of attack. Similarly, if the instantaneous angle of attack α is less than the reference angle of attack $\alpha_{ref}$, then the position of the canard wings 124, 126 is moved down at a slow and gradual rate causing the pitch attitude and instantaneous angle of attack α to increase toward the desired angle of attack. As the aircraft 100 reaches the conversion speed of approximately 120 to 140 knots, the rotor blade 104 provides essentially zero lift of the aircraft 100 and the canard wings 124, 126 are adjusted to achieve an angle of attack of 0. In addition, the mast valve 202 is closed, and at this point, the rotor braking is initiated and when the rotor blade speed is reduced sufficiently, the teeter lock is activated.

Fixed-wing Mode of Operation

The fixed-wing mode of operation is when the aircraft 100 is traveling at a forward velocity of between 120 to 140 knots and greater. In the fixed-wing mode of operation, the mast valve 202 is completely closed, the cruise nozzle 204 is completely open, and the directional control nozzles 206 are closed. The rotor blade 104 is locked in place. The engine back-pressure is now regulated by the cruise nozzle 204 so that the closed loop stall margin control is no longer needed, and the forward velocity is controlled by the engine throttle. The lift of the aircraft 100 is generated by the aero surfaces. In one embodiment, the canard wings 124, 126 and the horizontal tail 128 are programmed downward. The aircraft pitch attitude is adjusted to achieve a positive angle of attack with respect to the fixed wing.

Figure 6:
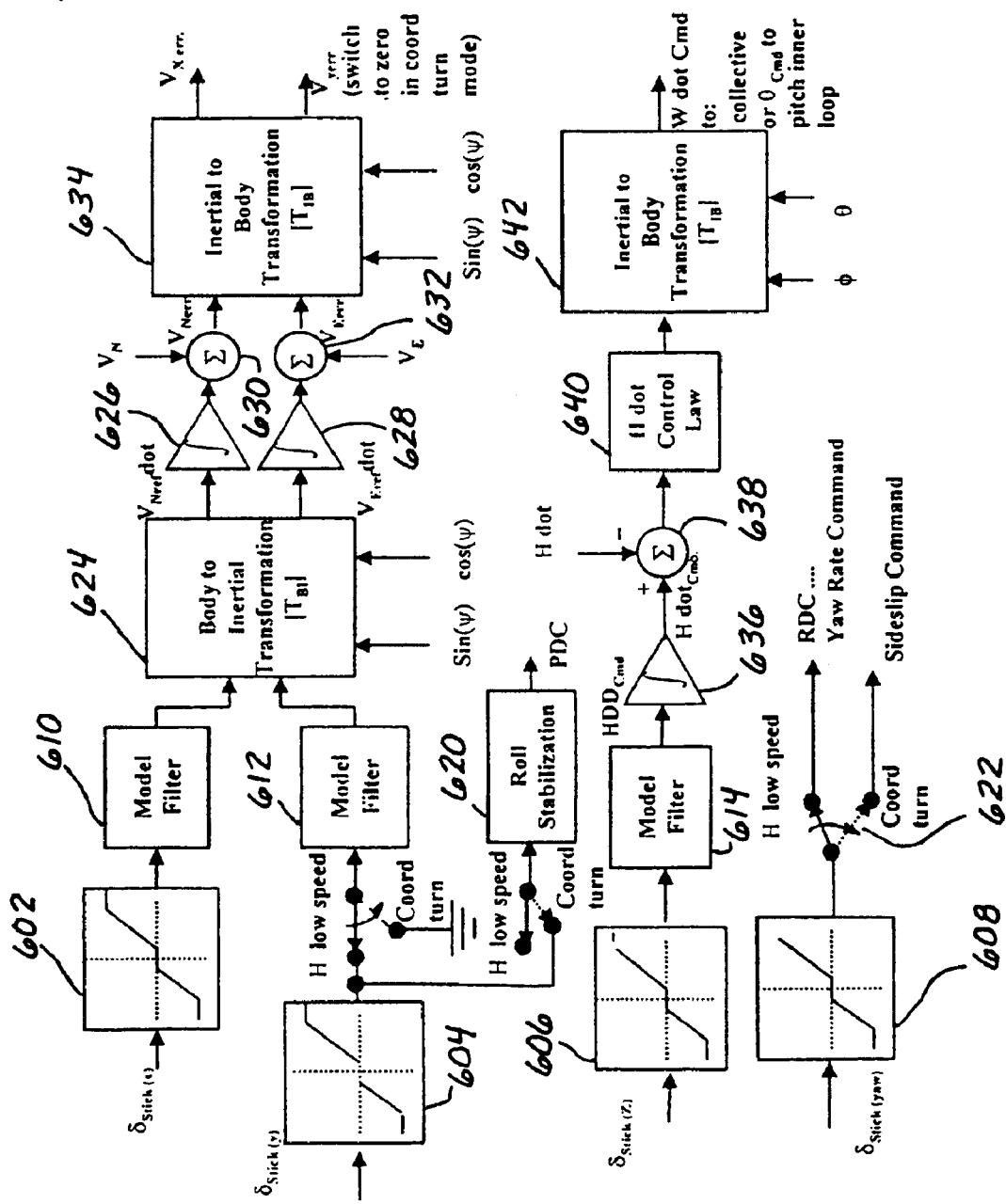
FIG. 6 is a simplified block diagram illustrating the generation of the pilot's control stick commands and related velocity vector commands in the semiautonomous mode, where the pilot commands the aircraft velocity vector.

FIG. 6 is a simplified block diagram illustrating the generation of the pilot's control stick commands and related velocity vector commands in the semiautonomous mode, where the pilot commands the aircraft velocity vector. The block diagram illustrates the flow of command and stabilization data to the force and moment generating devices. The H refers to the helicopter mode, the C refers to the compound mode, and the F refers to the fixed-wing mode. The helicopter mode can be split into a low speed mode and a coordinated turn mode where the transition from the low speed mode to the coordinated turn mode occurs at between 20 and 30 knots. The variable HP indicates the pure helicopter mode and the variable HA indicates the augmented helicopter mode. The aircraft 100 remains in the coordinated turn mode for the entire speed regime above the transition speed. The rotor speed control uses the throttle in the helicopter mode and switches to control by collective in the compound mode. The stabilization loop outputs three angular acceleration commands, e.g., a pitch angular acceleration command (QDC), a roll angular acceleration command (PDC), and a yaw angular acceleration command (RDC), and a linear acceleration command, e.g., a vertical acceleration command (WDC).

The control stick commands (e.g., x-direction stick deflection δstick(x), y-direction stick deflection δstick(y), z-direction stick deflection δstick(z), yaw-direction stick deflection δstick(yaw)) are input into control blocks 602, 604, 606, 608, respectively. The control blocks 602, 604, 606, 608 continuously determine the flight envelope based on the flight mode and the velocity vector and limits the pilot's control stick commands based on the flight envelope. Each control block determines if the rate of change of the respective control stick command is approaching its instantaneous limit for the particular flight mode. If the control stick deflection or applied force approaches its instantaneous limit, then the control block adjusts the velocity vector to ensure that the aircraft 100 does not travel beyond its flight envelope. The adjustment to the variables of the velocity vector is performed gradually in proportion to the magnitude of the control stick commands and the proximity of the aircraft to the flight envelope. In one embodiment, the flight control system 400 generates a signal, e.g., an audible alarm or a voice synthesized message, to the pilot when an adjustment to the flight path has occurred. The signal notifies the pilot with the reason for the change in flight path.

The outputs of control blocks 602, 604, 606 are inputs to model filters 610, 612, 614, respectively. The model filters 610, 612, 614 are used to shape the commands so that the ensuing aircraft acceleration is smooth. A switch 616 is used to connect the control block 604 to the model filter 612. The switch 616 is in a closed position 616a, when the aircraft 100 is in the pure helicopter mode, and in an open position 616b, when the aircraft 100 is in the augmented helicopter mode. When the switch 616 is in the open position 616b, the input of the model filter 612 is connected to a ground, implying that the y stick command becomes 0. A switch 618 is used to connect the control block 604 to a roll stabilization block 620. The switch 618 is in an open position 618a, when the aircraft 100 is in the pure helicopter mode, and in a closed position 618b, when the aircraft 100 is in the augmented helicopter mode. When the switch 618 is in the closed position 618b, the output of the control block 604 is connected to the input of the roll stabilization block 620. The roll stabilization block 620 outputs the roll angular acceleration command (PDC).

When the aircraft 100 is in the pure helicopter mode, the output of the control block 608 is switched via switch 622 to produces a yaw rate command, which is used to control the rate of change of heading. When the aircraft 100 is in the augmented helicopter mode, the output of the control block 608 is switched via switch 622 to produces a sideslip command, which is used to command yaw while heading of the velocity vector is automatically maintained.

The outputs of the model filters 610, 612 are inputs to a body to inertial transformation block 624. In addition, sin(ψ) and cos(ψ) are also input into the body to inertial transformation block 624. Further details regarding the body to inertial transformation block 624 are described in, for example, the '646 patent. The outputs of the body to inertial transformation block 624 are fed into integrators 626, 628 whose outputs are fed into summing junctions 630, 632. The outputs of the summing junctions 630, 632 are fed into an inertial to body transformation block 634. Further details regarding the inertial to body transformation block 634 are described in, for example, the '646 patent. The outputs of the inertial to body transformation block 634 are an x velocity error signal ($V_{xerr}$) and a y velocity error signal ($V_{yerr}$). When the aircraft 100 is in the turn coordination mode, the y velocity error signal ($V_{yerr}$) has a value of 0.

The output of the model filters 614 is fed into an integrator 636, which outputs the $Hdot_{cmd}$. The summing junction 638 inputs on its left side the $Hdot_{cmd}$ and inputs on its upper side the aircraft vertical velocity Hdot. Thus, the summing junction 638 subtracts the aircraft vertical velocity Hdot from the $Hdot_{cmd}$ to produce an Hdot error, which represents the deviation from the desired vertical speed. The output of the summing junction 638 is input into an Hdot control law block 640, which contains proportional plus integral terms. The output of the Hdot control law block is input into an inertial to body transformation block 642, which outputs the $Wdot_{cmd}$. The $Wdot_{cmd}$ is the body axis version of a vertical acceleration command and is sent to the collective control in the helicopter mode or to the pitch attitude stabilization in the compound and fixed-wing modes.

Figure 7:
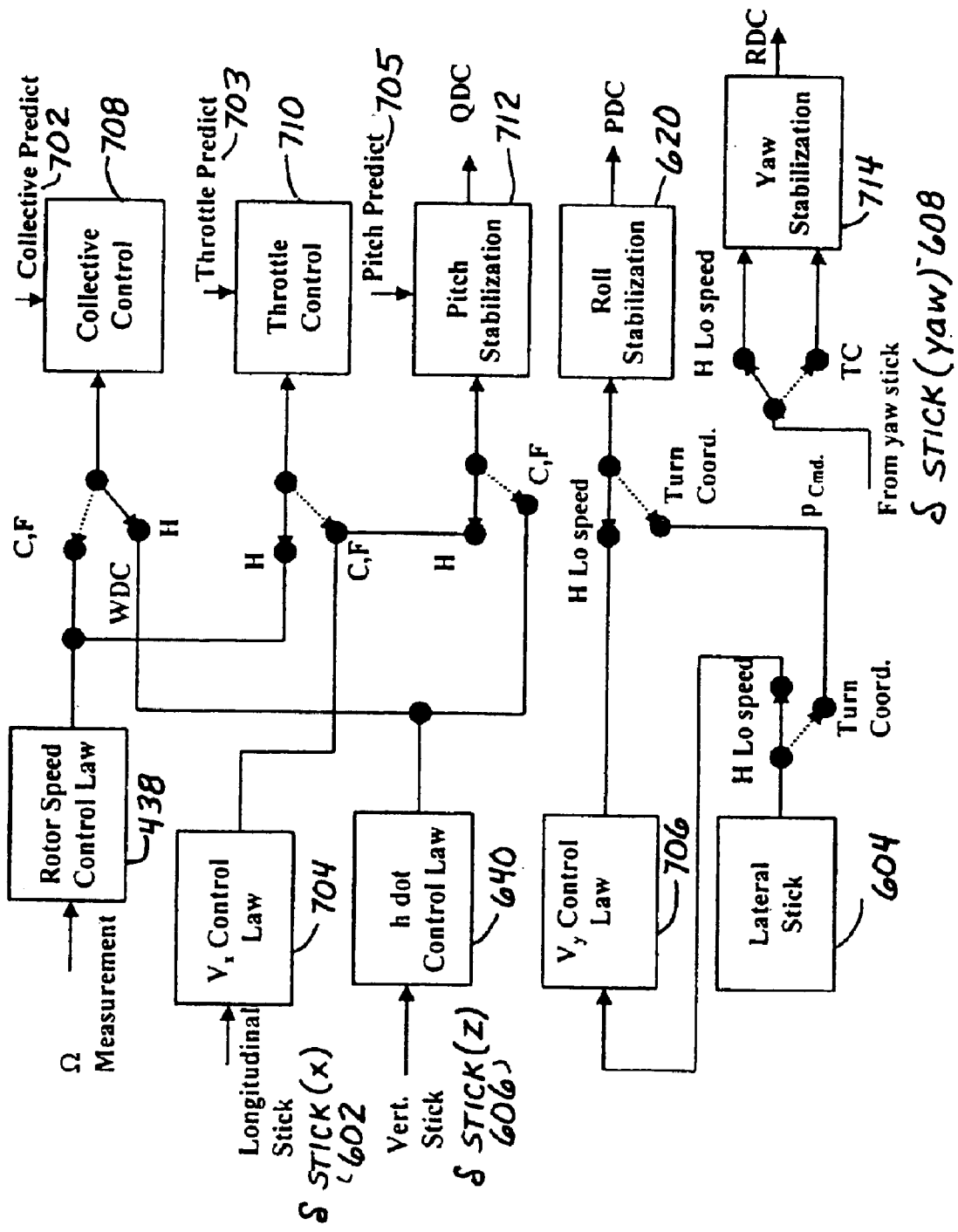
FIG. 7 is a simplified block diagram illustrating the switching of the control loops between the various flight modes.

FIG. 7 is a simplified block diagram illustrating the switching of the control loops between the various flight modes. Looking now at the upper left portion of FIG. 7, the actual rotor speed ($\Omega$) is input into the rotor speed control block 438, which determines the appropriate and safe rotor speed for the aircraft 100, and outputs a command to the rotor collective control 708 when in the compound mode or to the throttle control 710 to adjust the rotor speed in the helicopter mode. A collective predict command 702 is input into the rotor collective control 708 to help minimize errors in the closed loop controls.

The control stick command (i.e., x-direction stick deflection $\delta stick(x)$) is input into the control block 704, which outputs a command to either the throttle control 710 for the compound and fixed-wing modes or to a pitch stabilization block 712 for the helicopter mode. A pitch predict command 705 is input into the pitch stabilization block 712, to augment the closed loop control of the velocity loop. The control stick command (i.e., z-direction stick deflection $\delta stick(z)$), after appropriate filtering and integration, is input into the control block 640, which outputs a vertical acceleration command (WDC) to the rotor collective control block 708 in the helicopter mode, or the pitch stabilization block 712 in the compound and fixed-wing modes. The control stick command (i.e., y-direction stick deflection $\delta stick(y)$) is input into the control block 706, which outputs a command to the roll stabilization block 620 in the helicopter mode. The control stick command 608 (i.e., yaw-direction stick deflection $\delta stick(yaw)$) is input into a yaw stabilization block 714 where the command acts as a yaw rate command in the low speed helicopter mode or as a sideslip command in the turn coordination mode, which is activated for speeds greater than about 20 to 30 knots. The lateral stick input 604 becomes a proportional lateral velocity command, after filtering, coordinate transformation 624, and integration 628. Following another coordinate transformation from inertial back to body axis coordinates 634, a lateral velocity error is generated. The lateral velocity error generates a roll command in the roll stabilization block 620 when in the helicopter mode below the turn coordination speed. When speeds are large enough to activate turn coordination, the lateral stick 604 command is applied directly to the roll stabilization block 620, where it appears as a roll rate command. The output of roll stabilization block 620 is a roll acceleration command (PDC).

Figure 8:
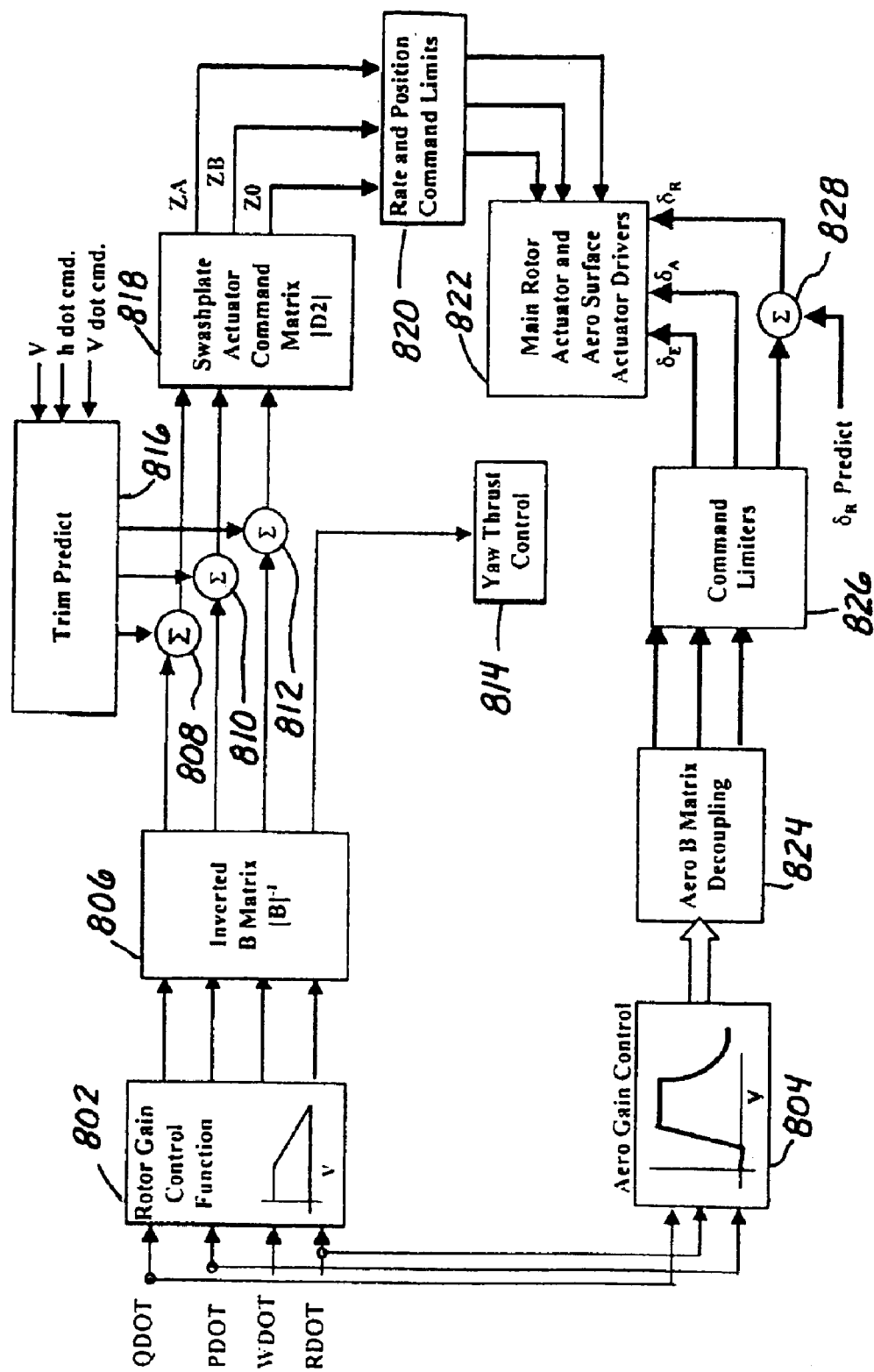
FIG. 8 is a simplified block diagram showing the acceleration commands applied to the actuator interfaces via the decoupling matrices.

FIG. 8 is a simplified block diagram showing the acceleration commands applied to the actuator interfaces via the decoupling matrices (this type of decoupling is sometimes referred to as B matrix inversions). The decoupling is performed by the Matrix blocks, which output specific position commands to the control actuators, e.g., the swashplate actuators, the elevon actuators, and the rudder actuators. Further details regarding the decoupling matrices are described in, for example, the '646 patent. The matrix inversion function is used to obtain the precise combinations of rotor swashplate and aerodynamic surfaces that yield the specific acceleration commanded. The integration of the rotor swashplate controls and the aerodynamic controls is accomplished by the technique of decoupling and the gain function. The gain control blocks 802, 804 are used to add aerodynamic controls to the helicopter swashplate controls and to specify that the rotor gain is 100 percent and the aero surface gain is 0 percent when the aircraft 100 is hovering. As the forward velocity of the aircraft 100 increases, the rotor gain is decreased in proportion to the increase in the aero surface gain. The gain control blocks 802, 804 also determine the surface moment effectiveness as a function of dynamic pressure (Q) at that surface, which includes effects of the downwash flow. Details regarding the swashplate actuator command matrix 818 are described in, for example, U.S. Pat. No. 5,850,615 to Osder, entitled "Rotor Blade Swashplate-Axis Rotation and Gyroscopic Moments Compensator," which is assigned to the assignee of the present invention. The disclosure of this patent is incorporated by reference herein.

Figure 9:
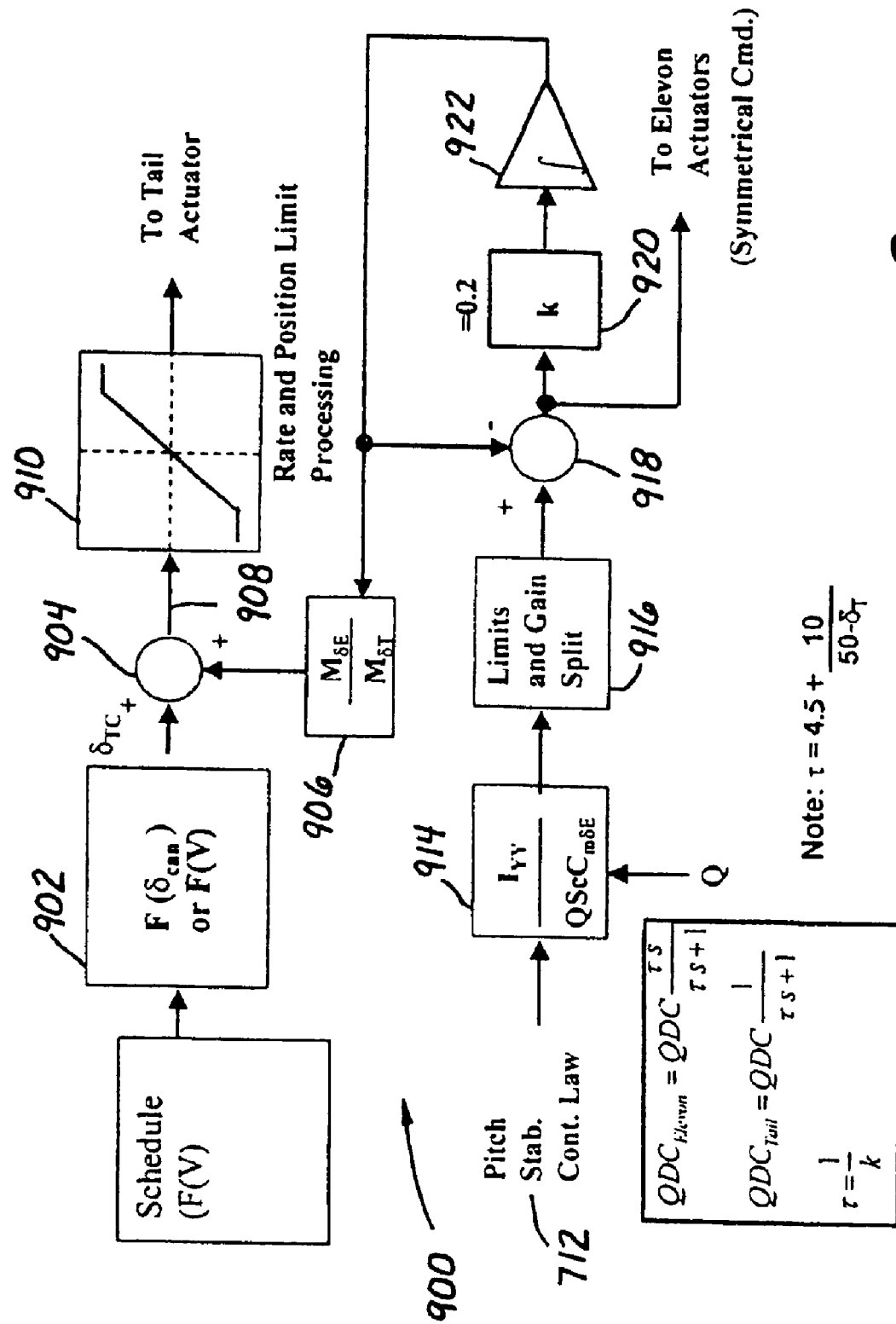
FIG. 9 is a simplified block diagram illustrating a split frequency closed loop control system that positions the horizontal tail surfaces.

FIG. 9 is a simplified block diagram illustrating a split frequency closed loop control system 900 that positions the horizontal tail surfaces. The split frequency control system 900 uses a continuous proportional split frequency filter to transfer steady state pitch moment control from the elevons 130, 132 to the horizontal tail actuator. The split frequency filter gives the elevons 130, 132 control of the frequency spectrum above frequencies of about 2.0 radians/second and gives the horizontal tail actuator control of the frequency spectrum below frequencies of about 2.0 radians/second. The time constant $\tau$ of the split frequency filter adjusts as the horizontal tail 128 approaches a limit position of approximately 50 degrees.

Several controls are involved in scheduling actuator positions as a function of forward velocity. For example, the schedules might include the canard wings 124, 126, horizontal tail 128, mast valve 202, cruise nozzle 204, and rotor speed reference. The horizontal tail 128 is scheduled as a function of velocity and is positioned in accordance with the pitch stabilization closed loop control law. The schedule function is added to the closed loop function.

Looking now at the upper left portion of FIG. 9, the measured aircraft traveling velocity (V) and the measured canard deflection ($\delta C$) are input into a gain block 902, which determines and outputs a reference signal F(V), which expresses a scheduled horizontal tail deflection at speed V. FIG. 9 shows the combination of the open loop schedule for the horizontal tail as derived from block 902, with the closed loop elements derived from the pitch stabilization command (QDC). The block 430 (FIG. 4) shows the aircraft's control actuators, including the horizontal tail actuator function, which is described with reference to FIG. 9. A function of forward velocity, V, similar to block 902, is applied to the canards 124, 126, the mast valve 202, the cruise nozzle 204, the lateral thrusters 116, 118, and the rotor speed reference. The function of forward velocity V is the open loop part of the control. In addition, as in the case of the horizontal tail control of FIG. 9, the closed loop control is also added to the lateral thrusters 116, 118, and to some extent, to the mast valve 202 and the cruise nozzle 204. The lateral thrusters 116, 118 use the closed loop control via differential left-right operation for yaw control in the helicopter and compound modes. The mast valve 202 and the cruise nozzle 204 position commands are adjusted as a function of how close the aircraft approaches the flight envelope limits. The rotor speed control 438 is generally always a closed loop function. In the helicopter mode, the rotor speed error is corrected via throttle (fuel controller) of block 430. In the compound and fixedwing modes, the rotor speed error is controlled via increasing or decreasing the collective position command, which is part of the rotor controls in block 430.

Figure 10:
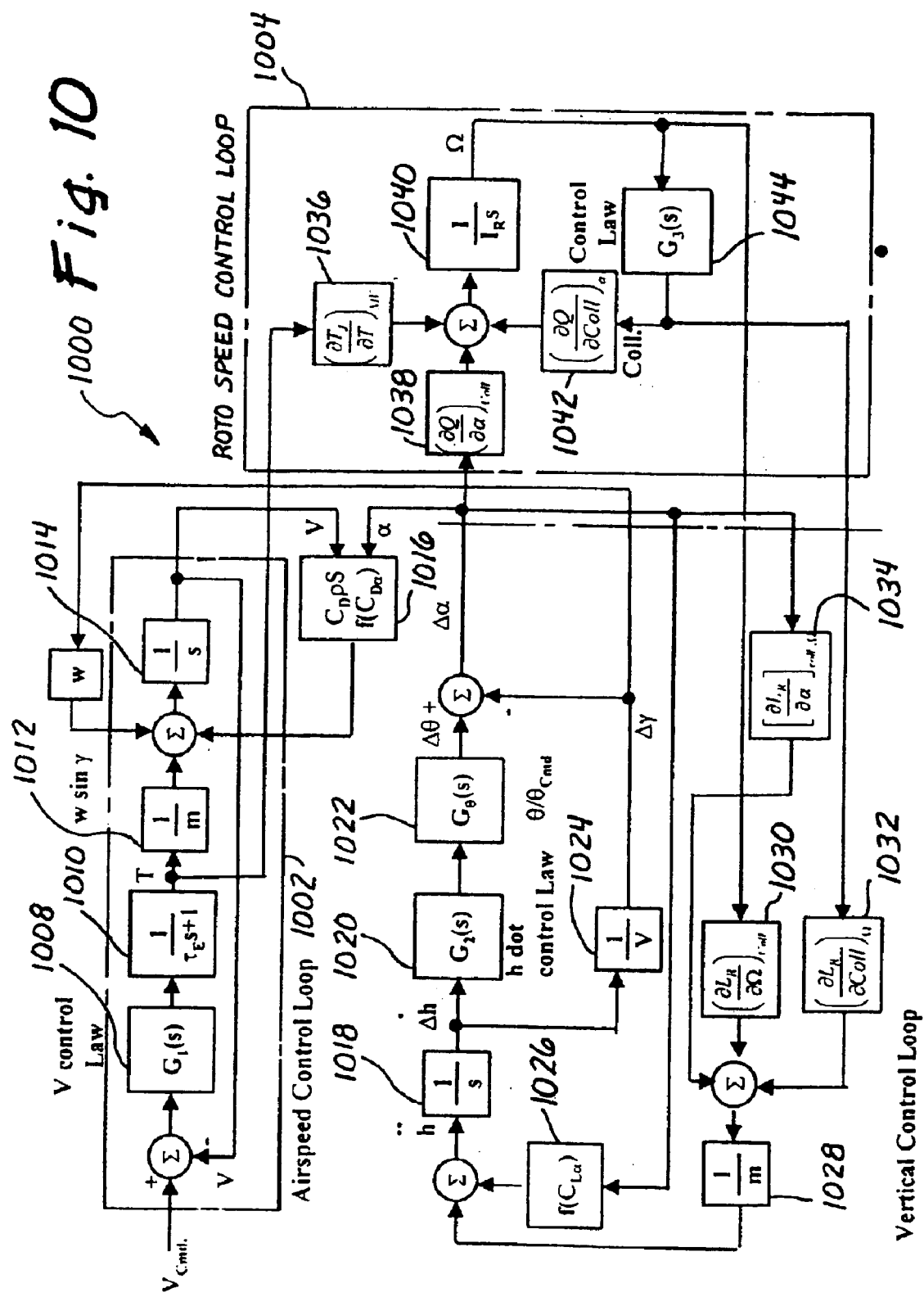
FIG. 10 is a simplified block diagram illustrating a control system showing how stability is maintained when the aircraft is in the compound mode.

FIG. 10 is a simplified block diagram illustrating a control system 1000 showing how stability is maintained when the aircraft 100 is in the compound mode. The control system 1000 that is stabilized has an airspeed control loop 1002, a rotor speed control loop 1004, and a vertical control loop 1006. The control system 1000 shows how the airspeed, rotor speed, and vertical movement of the aircraft 100 function together to ensure that the aircraft 100 is stable and does not travel outside its flight envelope. The control system 1000 provides consistent closed loop bandwidths for the airspeed control loop 1002 via phase compensation, for the rotor speed control loop 1004 via gain compensation, and for the vertical control loop 1006 via pitch modulation.

The airspeed control loop 1002 has a stable control because of the single integration and the engine lag $\tau_E$. The two coupling phenomena that add to the airspeed control loop 1002 are (1) the w sin γ term, which effectively gives an apparent drag increase for an increase in flight path angle, and (2) the actual drag change associated with the change in alpha (angle of attack) during the pitch maneuver to correct for flight path angle errors (γ). The change in gamma (γ) is determined by the vertical control loop 1006, which is coupled to the rotor speed control loop 1004. When the vertical control loop 1006 and the rotor speed control loop 1004 operate at their design bandwidths, the interaction is both stable and synergistic. For example, a pitch-up maneuver to correct for a gamma error increases alpha and causes the rotor torque (Q) to decrease via the $(\partial Q/\partial \alpha)$ coefficient. Hence, the rotor speed tends to increase thereby causing an increased collective via the $(\partial Q/\partial \text{Coll})$ coefficient. The rotor speed control loop 1004 then couples back into the vertical control loop 1006 via the $(\partial L_R/\partial \Omega)_{Coll}$ and $(\partial L_R/\partial \text{Coll})_\Omega$ coefficients. Also, the rotor lift increases slightly via the $(\partial L_R/\partial \alpha)_{\Omega, Coll}$ coefficient. Each of the coefficients varies when the constraints in collective and Ω are not maintained. The main coefficient in the vertical control loop 1006 during the compound and fixed wing modes is the $f(C_{L\alpha})$ term 1026, which is low when dynamic pressure is low. Hence, higher pitch attitude changes, and hence higher alpha changes are needed to increase the aircraft lift, which increases coupling to the rotor speed control loop 1004. When the collective is very low, the coefficient $(\partial Q/\partial \text{Coll})_\alpha$ approaches zero and may actually reverse polarity. When the coefficient has a reverse polarity, the control system 1000 can migrate to a stable equilibrium because the alpha is not constant.

For the non-linear coefficients, large errors in V or γ can cause coupling between the loops to effectively increase phase lags. One coefficient that can cause difficulty is the drag feedback to the airspeed control loop 1002 via $f(C_{D\alpha})$. This coefficient reverses polarity when the equilibrium condition has a negative pitch attitude. Typically, a nose up command in the vertical control loop 1006 should have increased drag because of the increased alpha. However, with the negative pitch attitude, increasing alpha results in a decreased drag. The consequence is to slow the convergence of the airspeed control via the throttle. In one embodiment, oscillatory responses in the airspeed control loop 1002 occurred at frequencies of about 0.5 radians/second. The compensator contained in $G_1(s)$ 1008 of the airspeed control loop 1002 corrects the phase in the frequency range where instability and coupling occurs. If the response of the airspeed control loop 1002 has primary frequencies greater than about 1.0 radian/second, then the adverse coupling can be avoided. To improve the phase in the low frequency region, a lead lag compensator within $G_1(s)$ 1008 is added to the displacement channel of the V control law. Without the lead lag compensator, the control law using the frequency domain notation is:

$$PLA_{cmd} = k_v(1+a/s)V_{Error}$$

where a is the ratio of integral to displacement gain. With the lead lag compensator, the control law using the frequency domain notation is:

$$PLA_{cmd} = k_v V_{Error}((\tau_1 s+1)/(\tau_2 s+1)+a/s)$$

where the baseline value of a is about 0.2. The compensator time constants are $\tau_1=4.0$ and $\tau_2=1.0$.

The lead lag compensator reduces the tendency toward speed flight path coupled oscillations in the compound mode when the rotor speed control loop 1004 is in a non-saturated region. To keep the rotor speed control loop 1004 from saturating, which means that the collective command has bottomed, a change in the mast valve and cruise nozzle schedules are implemented to provide for more thrust in the helicopter mode and at the lower end of the compound mode. This results in the forward speed being maintained more by the cruise nozzle thrust than by tilting the rotor lift forward. If the equilibrium pitch attitude is near zero, then the perturbation response of the rotor speed control loop 1004 is aided by the appropriate polarity of drag change resulting from the pitch attitude modulation.

The effect of envelope limiting on the coupling phenomena discussed above is a control law issue. If the rotor lift is essentially zero, the lower end of collective travel is near. During this condition, if the aircraft 100 experiences a significant rate of descent, the envelope limits regarding the capability of the interacting control loops may be reached. Consider the initial response to a descent command via the insertion of a negative h dot command. The vertical control loop 1006 commands a nose down attitude, which is associated with an initial decrease in alpha followed by a drop in gamma as gamma approaches ($\text{hdot}_{cmd}/V$). The drop in gamma results in an effective drag decrease, which may require a drop in throttle to maintain the reference airspeed. The decrease in alpha causes an increase in rotor torque, Q, which may require a drop in collective to allow the rotor speed control loop 1004 to maintain the reference omega (rotor speed). The drop in throttle lowers the available tip jet thrust needed to maintain the rotor speed thereby causing an additional command to drop the collective. The control capability ends when the bottom of available negative collective is reached. The steeper the rate of descent command, the more severe this problem becomes, because the throttle may be reduced to idle, and the minimum tip jet thrust needed to maintain rotor speed is lost. When the lower collective limit is reached, control is lost in the rotor speed control loop 1004. This condition is prevented from being reached by applying limits to the allowable h dot descend commands, depending upon the flight mode. The limit is most severe when the aircraft 100 is near the zero rotor lift condition.

Figure 11:
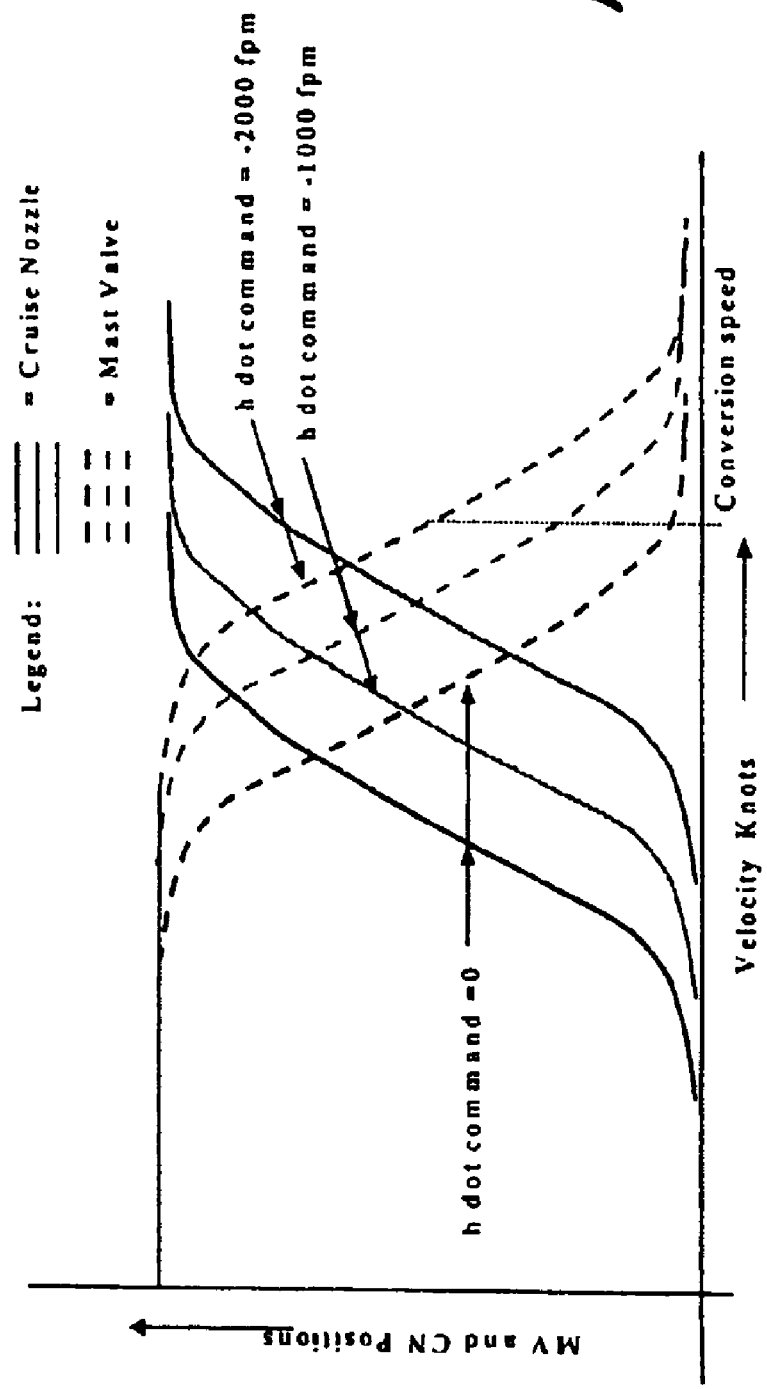
FIG. 11 is a graph illustrating the adjustment of the mast valve and cruise nozzle schedule as a function of the vertical speed descent command.

FIG. 11 is a graph illustrating the adjustment of the mast valve and cruise nozzle schedule as a function of the vertical speed descent command. Looking at the graph, the x-axis represents the position of the mast valve 202 and the cruise nozzle 204 and the y-axis represents the velocity of the aircraft 100. The graph indicates a conversion speed of approximately 120 knots. Utilizing the mast valve and cruise nozzle schedule, the maneuvering capability of the aircraft is not unnecessarily limited and the prior control law definitions are changed to move the equilibrium collective position to a sufficiently high position if large rates of descent are commanded. When the rate of descent reference is equal to 0, the mast valve schedule is a function of V. As the descent angles are commanded, the mast valve 202 is kept open in proportion to the Hdot command. The cruise nozzle schedule tracks the mast valve schedule, so that the more the mast valve 202 remains open, the more the cruise nozzle 204 can be closed. Keeping the cruise nozzle 204 more closed during the descent maneuvers allows the equilibrium throttle position to be at a sufficiently high level to satisfy the airspeed control loop 1002, while keeping the tip jet torque sufficiently high to avoid the need for a large drop in collective. Therefore, the collective equilibrium condition is moved to a value sufficiently far removed from bottoming the collective when the control system 1000 is trying to maintain rotor speed.

Envelope limiting can be provided by the velocity vector control using the control stick inputs. Envelope limiting is an especially difficult task for an aircraft having multi-flight modes since the flight envelope is profoundly different depending upon the flight mode. For example, the maximum speed limits differ if the aircraft 100 is in the helicopter mode compared to the fixed wing mode. Moreover, when in the compound mode, depending upon the extent of rotor unloading, there is a different flight envelope. The velocity vector control technique allows for incorporating the instantaneous flight envelopes into the command processing of the control stick inputs.

The Vx, Vy, and Hdot (similar to the Vz except for the polarity and coordinate frame) limits are a function of the flight mode and the altitude. For each flight mode, if the pilot's stick command of rate of change of the velocity vector component approaches the instantaneous limit, the pilot's stick command is constrained to prevent penetration of the limit boundary. This is done smoothly so that the rapidity of the constraint is proportional to the magnitude of the pilot stick command input and to the proximity to the envelope boundary. The envelope boundaries are continuously computed as a function of aircraft state and the configuration. The information used to compute the constraint on the pilot's stick command is simultaneously available for generating an audible alarm or voice synthesized message that gives the pilot appropriate feedback regarding the reason for change in the aircraft response to the pilot's command. The information can be used for fully automatic or so-called autonomous modes, since those modes result in commanded velocity vectors. If the commanded velocity vector components approach the known envelope limits, the commanded velocities are reduced at a rate proportional to their proximity or to their distance from the envelope limit.

Typically, the aircraft 100 has vertical speed boundaries that are defined by engine power for climbs, and by maximum speed constraints for descents. The compound flight mode poses a problem in regard to descent rates. Despite the change in the mast valve schedule to expand the allowable range of vertical speed descents in the compound mode, a limit vertical speed command can still occur, unless a constraint is applied to the allowable command. In addition, a more conventional upper bound to the allowable climb command occurs.

Figure 12:
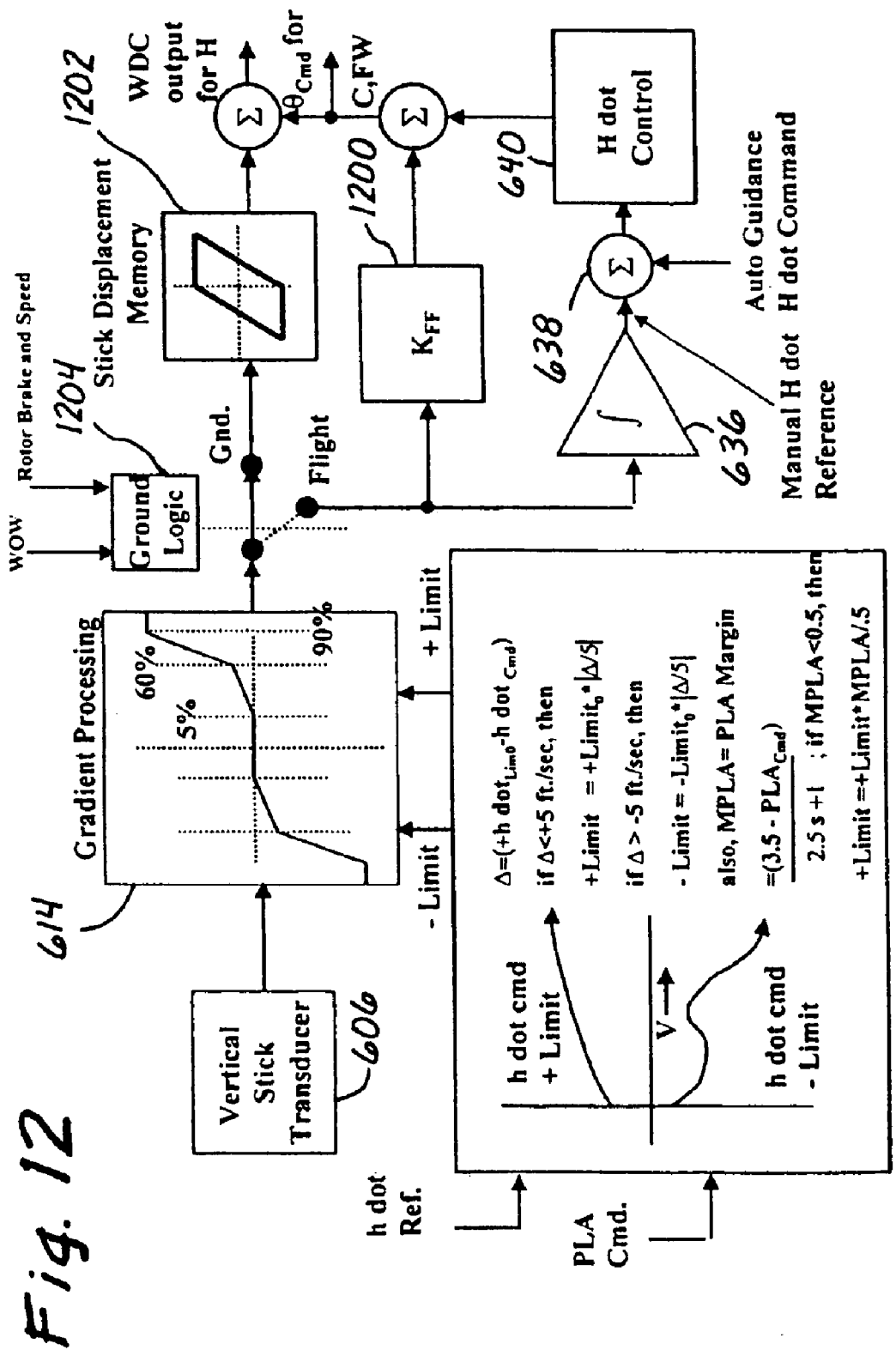
FIG. 12 shows the imposition of envelope constraints on the Hdot commands received from the pilot's control stick.

FIG. 12 shows the imposition of envelope constraints on the Hdot commands received from the pilot's control stick. The Hdot boundary is a function of aircraft characteristics such as altitude, mode of operation, power availability, and velocity. The Hdot command limits are defined for positive and negative values of the commanded Hdot and as a function of V and h. The drop in the Hdot descent limits at values of V consistent with the compound mode speeds is why steep descents may not be possible at those conditions. Power availability also enters into the limiting algorithm. If the limiting boundary is predicted with sufficient accuracy, and the aircraft 100 runs out of power while commanding a steeper climb, a vernier correction is performed on the limit computation. The limit computation is on the allowable h double dot that can be commanded. If the pilot's command stick is not out of detent, then the limiting cannot be activated. One feature of the limiting process is that the limit includes inherent anticipation. If a large climb command is being inserted, the limit occurs before the envelope value is reached. For example, consider a climb limit of 2400 feet per minute (40 feet/second). If a large climb command is being inserted, then the limit begins to be applied at about 35 feet per second. If a small climb command is being inserted, the limit may not be felt until $\Delta$ approaches zero (h $\text{dot}_{Max}$-h $\text{dot}_{Cmd}$)$\to$0. The importance of the limiting function increases as the average PLA (throttle) setting approaches about 3.5 volts, which is the maximum value. When $\Delta$=0, the input to the command integrator is 0. Hence, the value of the manual h dot reference (command) cannot exceed the limit value. An audio warning can be provided whenever the absolute value of $\Delta$ falls within 5 feet per second and the vertical command stick is out of detent in the polarity that leads to exceeding the h dot limit. This is the region where limit corrections become active. The plot of h dot limit Vs V includes an h dependence, which allows a constraint on maximum altitude of flight and for added safety, a constraint on the commanded descent rates when the aircraft 100 is near the ground.

Figure 13:
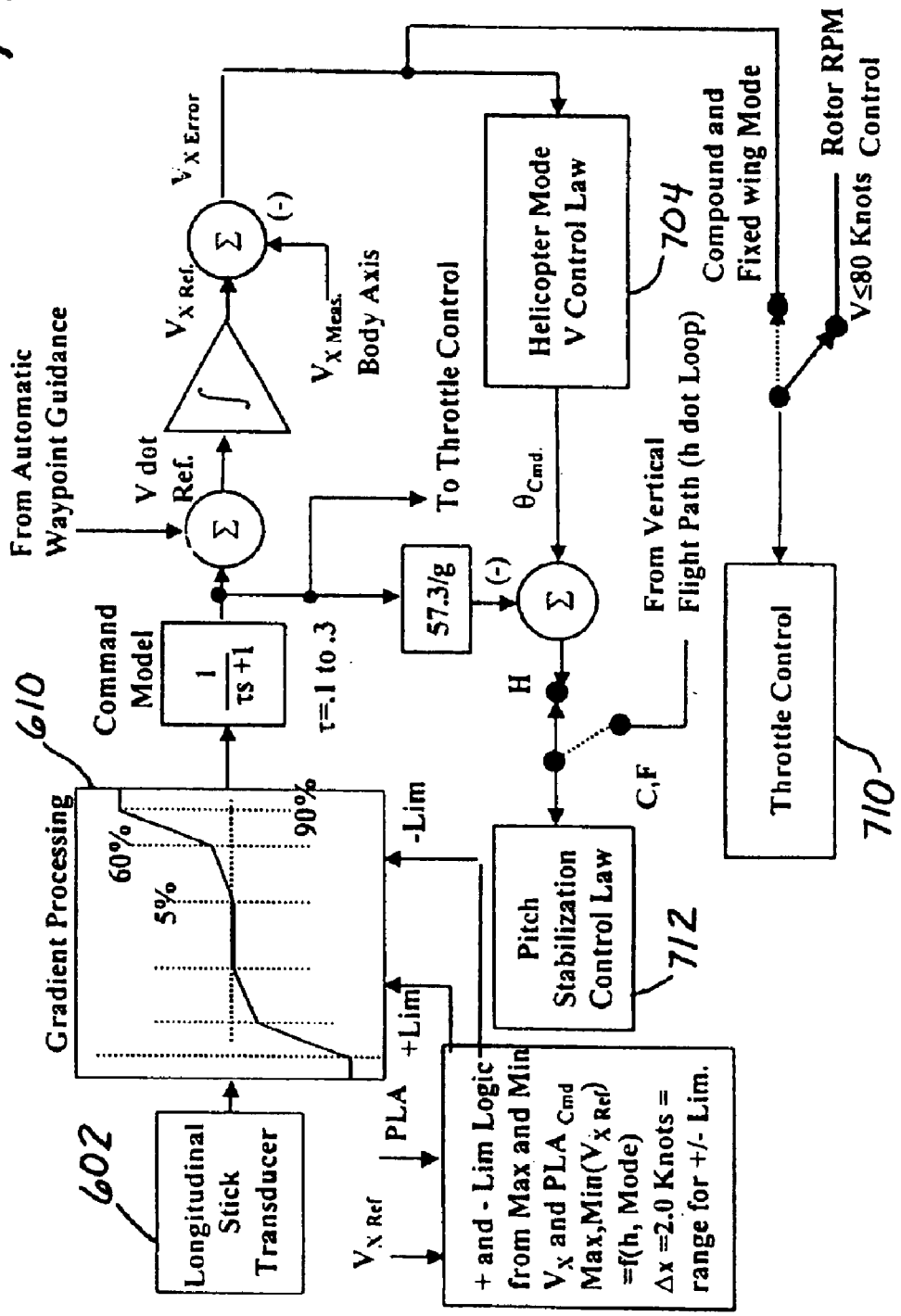
FIG. 13 is a simplified block diagram illustrating the manual control of Vx and the constraints on the maximum value of Vx dot (acceleration)

FIG. 13 is a simplified block diagram illustrating the manual control of Vx and the constraints on the maximum value of Vx. The forward velocity Vx is a function of h and the control mode. As the pilot's control stick is moved to command a forward acceleration and hence to increase the forward velocity of the aircraft 100, the stick commands control and limit the forward velocity to ensure that the Vx envelope is not exceeded. For example, if the aircraft 100 is in the compound mode, the forward velocity Vx is typically limited to approximately 130 knots until the rotor blade 104 is stopped and locked in a fixed position, thereby activating the fixed-wing mode.

For the longitudinal mode, $\Delta$ is equal to $(Vx_{Max}-Vx_{Cmd})$ When the absolute value of $\Delta$ exceeds about 2 knots, the limit on the appropriate polarity stick command begins to decrease. In one embodiment of the helicopter mode, the maximum negative value of $Vx_{Ref}$ is about $-10$ knots. In one embodiment of the fixed wing mode, the maximum positive value of $Vx_{Ref}$ is about 180 knots. For the longitudinal mode, a PLA $\Delta$ function is included to prevent a higher speed reference from being inserted if the PLA (throttle) is approaching its maximum limit.

Figure 14:
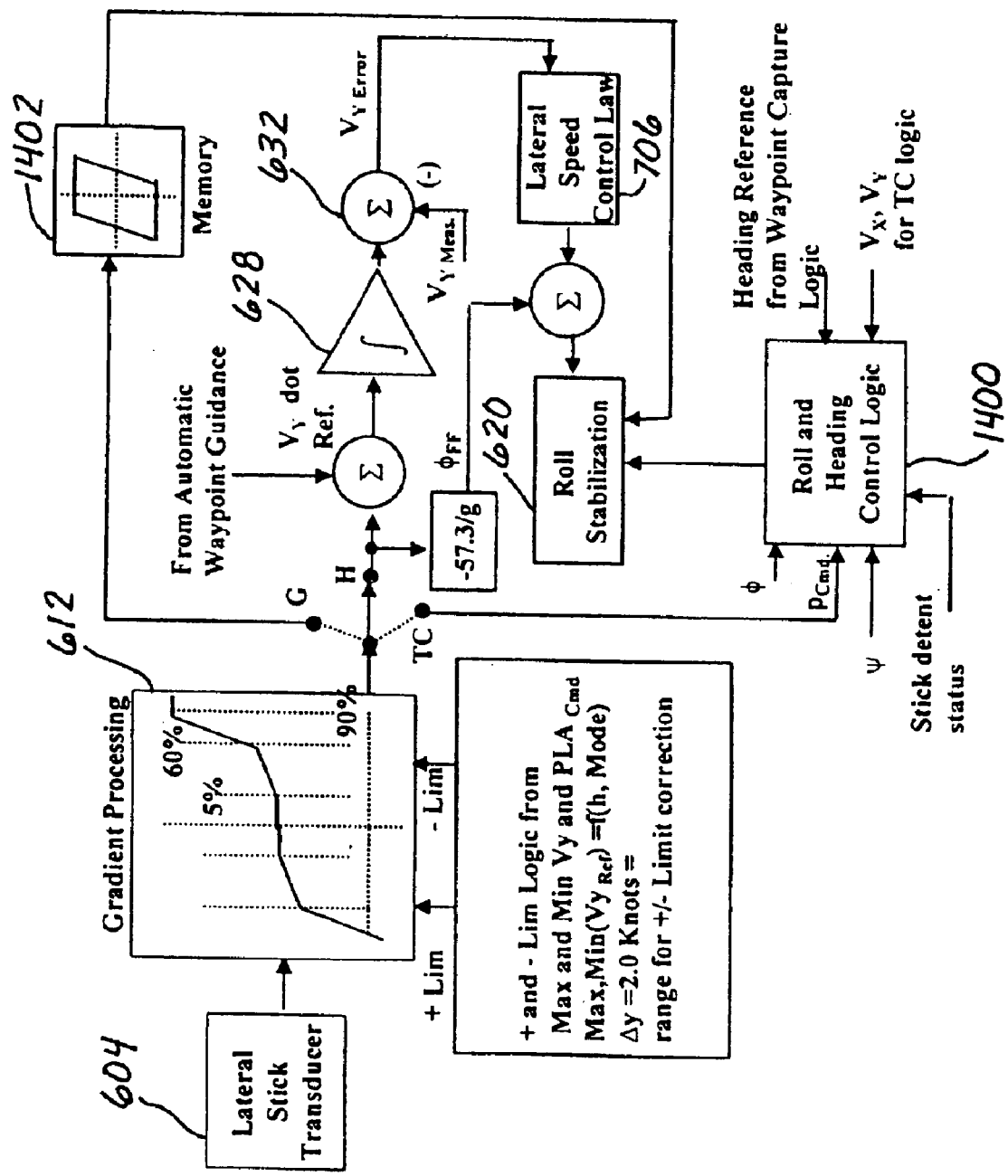
FIG. 14 is a simplified block diagram illustrating the manual control of Vy and the constraints on the maximum value of Vy dot (acceleration)

FIG. 14 is a simplified block diagram illustrating the manual control of Vy and the constraints on the maximum value of Vy. As the pilot's control stick is moved to increase the lateral velocity of the aircraft 100 when in the helicopter mode below about 20 to 30 knots, the stick command controls and limits the lateral velocity Vy to ensure that the Vy envelope is not exceeded. For example, when the aircraft 100 is in the helicopter mode, the lateral velocity Vy is typically limited to less than about 20 to 30 knots. At higher speeds, the lateral velocity Vy is maintained at about 0 by the coordinated turn mode. The lateral velocity Vy may not be maintained near 0 when yaw sideslip command maneuvers are inserted via the pedals or via an appropriate sidestick type of yaw control. The yaw sideslip command maneuvers are imposed based on a maximum lateral velocity command. The command limiting illustrated in FIG. 14 applies to the pure (low speed) helicopter mode.

Despite the change in the mast valve schedule to expand the allowable range of vertical speed descents in the compound mode, a limit vertical speed command might occur unless a constraint is applied to the allowable command. Likewise, a more conventional upper bound to the allowable climb command occurs.

As the aircraft 100 approaches the speed at which transition to fixed wing mode can occur, a final adjustment of the aero surface deployment occurs to assure that the rotor is unloaded to the maximum reasonable extent. At a given airspeed and altitude, the aero lift should approximate the aircraft weight in accordance with the following:

$$L_{Aero}=0.5*\rho(h)*V_T*V_T*S[C_{Lcanard}(\alpha, \delta_C)+C_{Ltail}(\alpha, \delta_T)+C_{Lfuselage}(\alpha)]=W\cos(\gamma)\cong W$$

At a given altitude for conversion, the known values are the $\rho(h)$ (air density at the existing altitude), the predicted lift coefficients for a desired value of $\alpha$, and the predicted weight W for each value of $V_T$, since the canard and tail are scheduled as a function of $V_T$. The desired value of alpha is 0 degrees. Hence, the value of $V_T$ is the true airspeed for conversion. Defining the nominal value of tail deflection from the schedule is limited because the horizontal tail 128 is also positioned by the closed loop pitch stabilization control in order to maintain the steady state pitch trim, a quantity that may vary with center of gravity uncertainty. Therefore, if the proper value of VT is reached but $\alpha\neq 0$, then the vernier adjustment is activated. The vernier adjustment algorithm is as follows:

$$V_{Conversion}=f(h);$$

If $abs(V_T-V_{conversion})\geq threshold\cong 1.0$ to 2.0 knots then enable vernier mode;

If the vernier mode is enabled and the automatic system or pilot activates the vernier command, then If $\alpha>+0.25$, then the $\delta_{canard}$ rate=+a;

If $\alpha<-0.25$, then the $\delta_{canard}$ rate=-a;

If $abs(\alpha)\leq +0.25$, then the $\delta_{canard}$ rate=0, and the conversion is enabled.

The commanded canard rate (a) is about 0.5 to 1.0 degrees per second. As the canard deflection ($\delta_{canard}$) increases or decreases, the flight path error due to the instantaneous lift change is automatically corrected by the pitch attitude modulation of the vertical control loop 1006. The effect of the vertical control loop 1006 constraining flight path angle ($\gamma$) is to make this change in pitch attitude cause an equivalent change in the angle of attack ($\alpha$).

Figure 15:
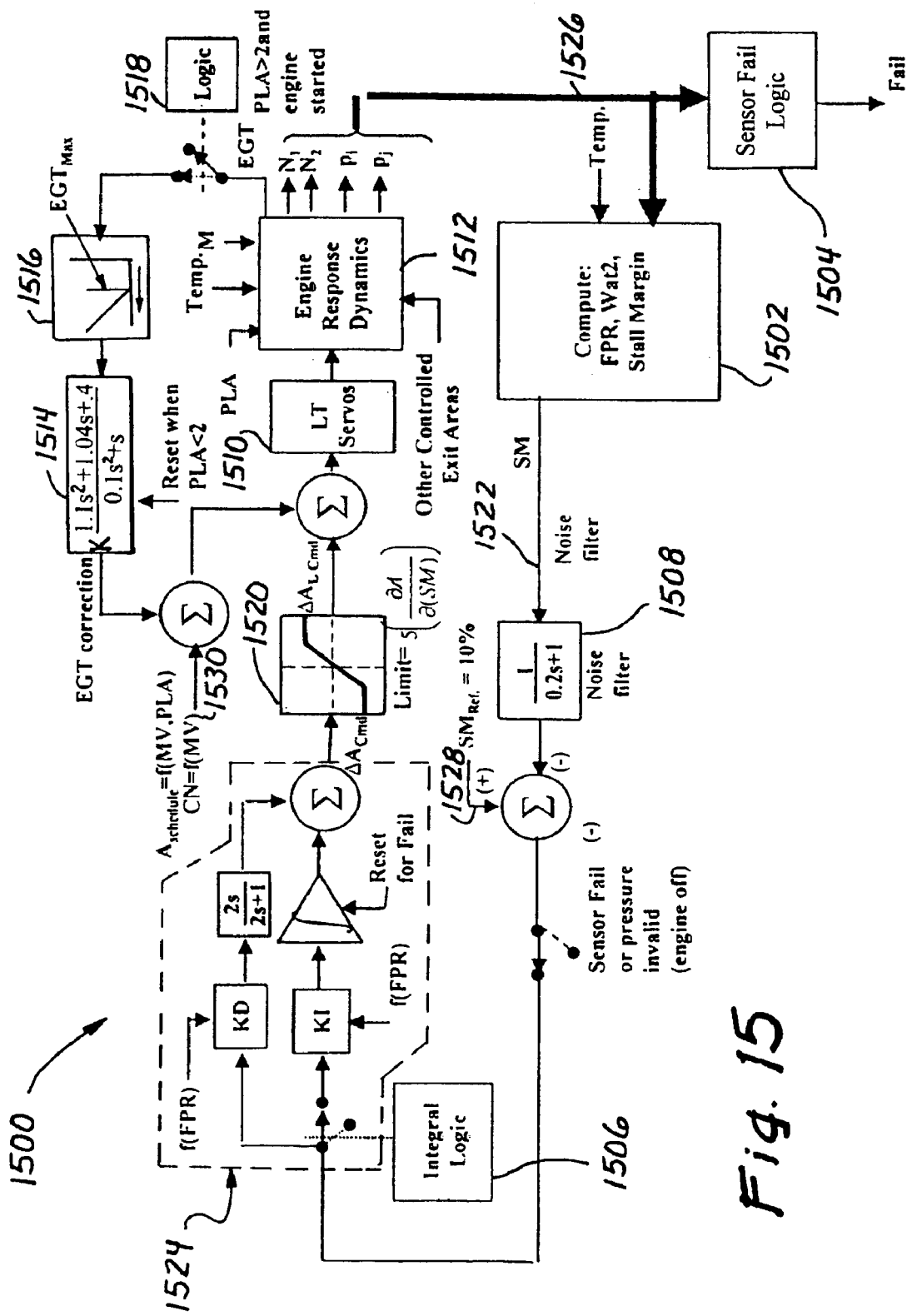
FIG. 15 is a simplified block diagram of a backpressure and stall margin control system with exhaust gas temperature exceedance correction and sensor fail monitoring logic.

FIG. 15 is a simplified block diagram of a backpressure and stall margin control system 1500 with exhaust gas temperature (EGT) exceedance correction and sensor fail monitoring logic. The stall margin control system 1500 uses exit area modulation to provide active control of the engine stall margin. The possibility of engine stall exists because of the possibility of choke points at the mast valve 202 when the mast valve 202 is closing and the possibility of large power transients associated with certain commanded maneuvers. To maintain a safe margin above stall point, the control system 1500 uses active stall margin control 1502 by modulating symmetrical opening and closing of the directional thrusters 206 (lateral thrusters 116, 118). The active stall margin control 1502 computes instantaneous fan pressure ratio and desired fan pressure ratio for instantaneous engine conditions. The stall margin is derived from an equation that relates to fan pressure ratio, engine mass flow parameters, and various pressure measurements. In particular, the stall margin (SM) 1522 is computed from the fan pressure ratio and the mass flow (Wat2). The difference between the desired or reference stall margin 1528 and the instantaneous measured stall margin 1522 uses a control law 1502 that commands a variable exit area derived from symmetrical modulation of the lateral thrusters 116, 118. The backpressure or stall margin control system 1500 commands a rate of change of the effective exit area experienced by the engine 200 as a result of the directional nozzle position modulation. Typically, a ten percent stall margin reference 1528 is used. A departure from the stall margin reference 1528 commands a proportional plus integral control loop 1524 that, after appropriate sensitivity adjustments and limiters, commands displacements, positive or negative, of the lateral thruster actuators. Added to the proportional plus integral control loop 1524 is a check of the EGT, which attempts to increase the stall margin reference 1528 in the event of EGT exceedances.

FIG. 16 is a simplified block diagram illustrating a pitch axis control loop 1600 for automatic autorotation of the rotor blade 104 in the event of engine failure. The ability of the rotor blade 104 to auto rotate typically requires attaining a very high angle of attack on the rotor blade 104 in order for the rotor blade 104 to maintain an acceptable autorotation speed. The high angle of attack is obtained with a very steep descent rate. The steeper the descent rate, the more difficult the critical timing needed to perform the terminal flare maneuver that attempts to bring the forward and vertical velocities to acceptable values near zero at touchdown. The pitch axis control loop 1600 includes an automatic autorotation solution that measures the critical aircraft states such as rotor speed, forward speed, rate of descent, and altitude above the ground, and computes the predicted states as a function of various maneuvers, thereby permitting the precise timing of the required maneuvers. The timing is critical and is difficult (if not impossible) for a pilot to perform manually. When the autorotation descent is initiated, the speed reference is set to about 60 knots, using the helicopter mode's airspeed on pitch control.

If the flight control system 400 detects an engine failure, the engine good flag is cleared indicating that the engine is not operating correctly. The engine throttle control loop 1601 (block 710 of FIG. 7) periodically monitors the engine good flag and enables an autorotation mode when the engine good flag has been cleared. The engine throttle control loop 1601 immediately initiates an automatic autorotation control sequence, which sets the aircraft 100 speed to about 60 knots and maintains the speed via pitch attitude modulation where the speed error from 60 knots uses the proportional plus integral control law 1601 to correct speed error. In one embodiment, the automatic autorotation control sequence transmits a predicted command to the flight control system 400 to set the rotor speed of the rotor blade 104 to 100% to 104% of full revolutions per minute (RPM). During autorotation, the rotor speed is controlled by modulating the collective. The V dot command is input at $H_{flare}$.

Figure 17:
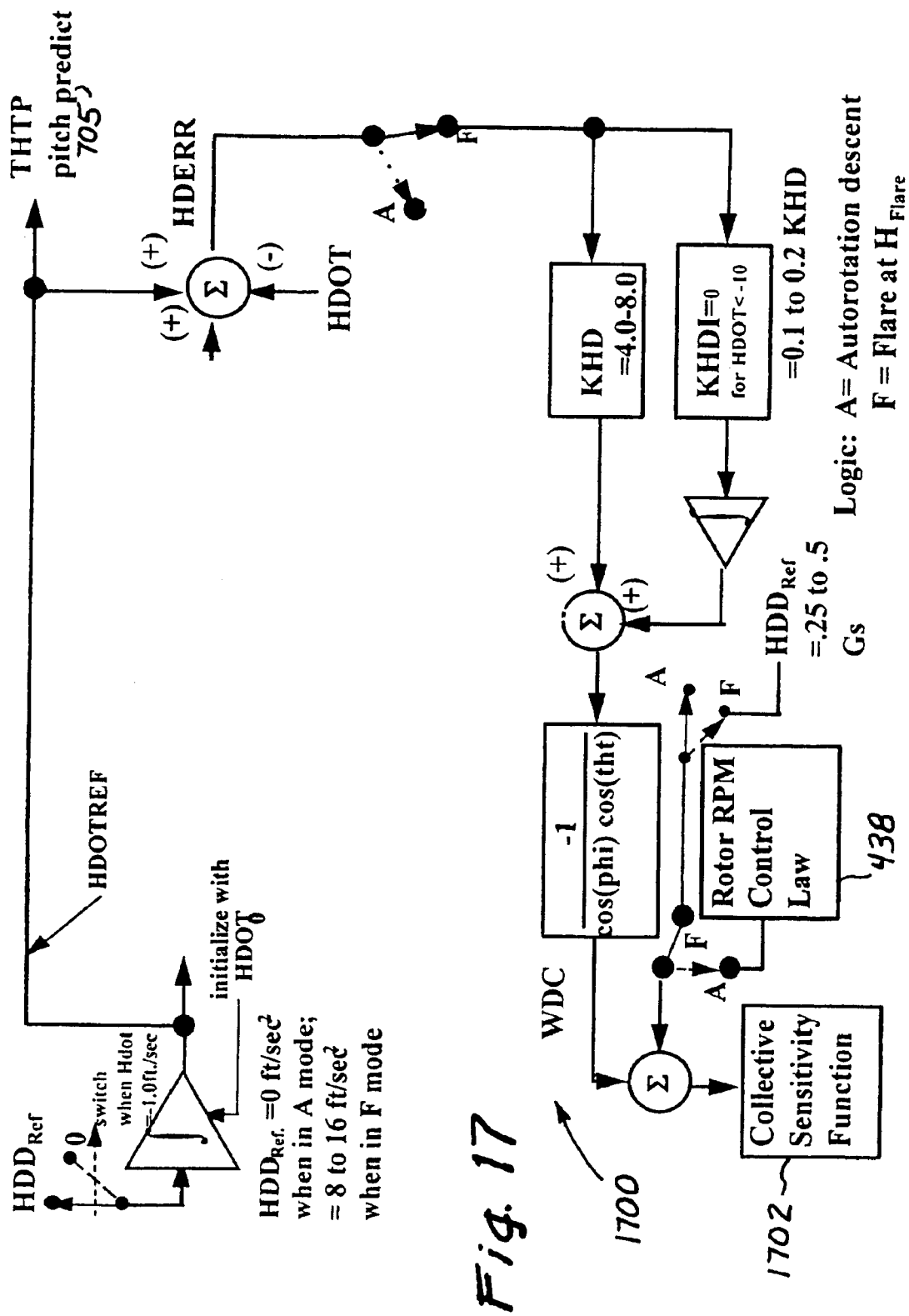
FIG. 17 is a simplified block diagram illustrating a vertical position control loop for automatic autorotation of the rotor blade 104 in the event of engine failure.

FIG. 17 is a simplified block diagram illustrating a vertical position control loop (flare control system) 1700 for the automatic autorotation control sequence. The pitch command (thtc) is limited to a reasonable value based on an attitude consistent with proper touchdown on the landing gear. The V dot command is based on the energy relationship between the change in the potential energy rate and the kinetic energy rate, assuming that there are no energy losses. Since energy losses exist, the V dot equation is an approximation that is refined by multiplying with a loss coefficient to account for the energy losses. The loss coefficient is obtained from simulation and flight data. In general, a finite value of V at touchdown is acceptable in order to achieve touchdown vertical velocities that are less than about 5 feet/second. The reference vertical velocity at touchdown is about −1.0 feet/second, but achieving that value depends on whether there is enough control authority to arrest the rate of descent, which is dependent on the energy in the rotor blade 104 and the decelerating torques on the rotor blade 104 generated by the flare maneuver. The flare control law for arresting the vertical descent is shown on FIG. 17. Looking at FIG. 17, the collective control is switched back to generating vertical acceleration commands while the rotor speed is allowed to decay. The flare initiate altitude is defined as $H_{flare}$ and is determined by the vertical descent velocity ($HDOT_0$). Typical values for that acceleration are between about 10 and 20 feet/second$^2$. When the flare altitude is reached, the acceleration reference is integrated to generate a dynamic $HDOT_{Ref}$ and the integration stops when H dot reaches about −1.0 feet/second. Also, a feedforward command is added to the WDC output when the flare is initiated. The feedforward command is the vertical acceleration reference ($HDD_{Ref}$). The total WDC output is converted to collective command via the collective sensitivity function, which varies with Ω, which changes rapidly during the control sequence.

If the autorotation descent rate is too large for the control system 1700 to achieve a terminal touchdown rate of about −1.0 feet/second, then all of the control commands are saturated. That is, if the collective command is at a maximum so the linear control law is not in effect, the desired touchdown vertical rate may not be attained. For the conditions, the control system 1700 achieves the best rate of descent attainable. If the control system 1700 operates below saturation levels, and the −1.0 feet/second vertical rate is not attainable, then some optimizing regarding the reference flare acceleration can be followed. For example, in calibration studies used with simulations, if the control system 1700 does not reach the −1.0 feet/second vertical rate because the acceleration reference was too low, then the acceleration reference is increased. If the control system 1700 has too much vertical acceleration and the vertical rate of −1.0 feet/second is reached at an altitude of several feet above the ground, then the acceleration reference is reduced. Optimized designs are obtained for each aircraft configuration via these simulator evaluations. During the flare maneuver, when the vertical speed is controlled via collective, a forward deceleration is commanded so that the resulting thtc commands a pitch up or increasing angle of attack. If the deceleration command is properly calibrated to the vertical flare maneuver, the increasing angle of attack lowers the rotor torque sufficiently to help maintain rotor speed despite the increasing collective associated with the vertical flare.

Figure 18:
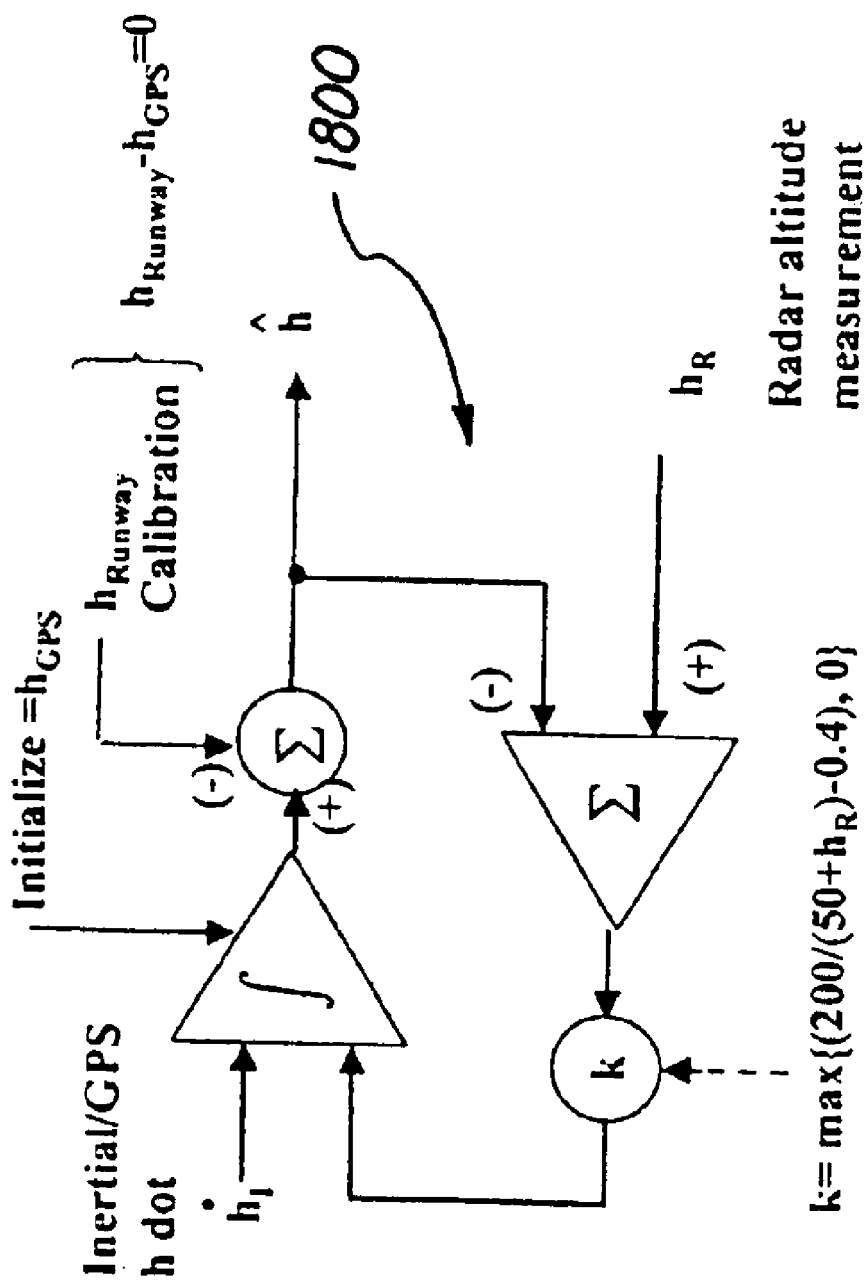
FIG. 18 is an altitude estimator for determining the vertical position of the aircraft during the automatic autorotation of the rotor blade in the event of engine failure.

FIG. 18 is an altitude estimator 1800 for determining the vertical position of the aircraft 100 during the automatic autorotation of the rotor blade 104 in the event of engine failure. The altitude estimator 1800 is also useful for normal landing operations. The altitude estimator 1800 provides for 100% transition to radar altitude when the aircraft 100 is at an altitude of near 10 feet and provides for variable time constant inertial smoothing to accommodate rough surfaces. The filter supports automatic modes that include automatic landing in the helicopter, compound or fixed wing modes. The estimator combines an inertial/GPS altitude module and a radar altitude module. The velocity vector and the position vector are obtained from the inertial/GPS altitude module. The estimator algorithm describes the h variable as the aircraft's actual height above the z=0 reference in the x, y, z coordinate frame. The runway height is input into the control system 400 prior to takeoff. Since the z=0 reference is the actual runway height, the inertial/GPS altitude module provides a vertical measurement accuracy of between 1.0 and 2.0 meters. This accuracy, however, is not adequate for landing the aircraft 100 in the autorotation mode. Therefore, the radar altitude module is used to increase the accuracy of the altitude measurement during the final phase of the landing of the aircraft 100 in the autorotation mode. The estimator algorithm converts the h derived from the inertial/GPS altitude module to an h derived from the radar altitude module. The control loop performs the function of a typical Kalman filter estimator often used in contemporary navigation systems except that the update gains are programmed empirically, whereas in the typical Kalman filter, the updated gains are computed as a function of the measurement accuracy statistics or specifications. The time constant is approximately 2.5 seconds at 200 feet, approximately 1.07 seconds at 100 feet, approximately 0.625 seconds at 50 feet, and approximately 0.34 seconds at 10 feet. The radar altitude module may also filter the vertical measurement (with no phase lag associated with the filtering) for smoothing the terrain roughness and the related radar noise.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

What is claimed is:

1. A jet-powered tri-mode aircraft capable of automatically transitioning from a helicopter mode to a compound mode to a fixed-wing mode without any intervention by a pilot of the aircraft, the aircraft comprising:
   a fuselage;
   a turbofan engine mounted within the fuselage for producing an exhaust gas flow;
   a rotor blade having a plurality of exit nozzles for outputting the gas flow, the rotor blade being mounted on the fuselage;
   a mast valve for regulating the gas flow to the plurality of exit nozzles of the rotor blade;
   a cruise nozzle for regulating and outputting the gas flow; and
   a scheduler for scheduling the mast valve and the cruise nozzle as a function of aircraft speed and for monitoring the gas flow being output from the plurality of exit nozzles, the mast valve, and the cruise nozzle to prevent the turbofan engine from stalling.

2. The aircraft according to claim 1, further comprising an engine stall controller for receiving a command from the scheduler if the plurality of exit nozzles and the cruise nozzle are unable to output enough gas flow to prevent the turbofan engine from stalling and for modulating an exit area based on the command to achieve a desired engine stall margin.

3. The aircraft according to claim 2, wherein the exit area is a plurality of lateral thrusters including a first lateral thruster positioned on a left side of the fuselage and a second lateral thruster positioned on a right side of the fuselage.

4. The aircraft according to claim 1, wherein the scheduler schedules the mast valve and the cruise nozzle to provide a smooth transition from the helicopter mode to the compound mode to the fixed-wing mode.

5. The aircraft according to claim 1, further comprising a canard wing attached to a front end of the fuselage and a horizontal tail having a plurality of elevons and being attached to a rear end of the fuselage, the canard wing and the horizontal tail are configured to provide control of the aircraft.

6. The aircraft according to claim 5, further comprising a control stick for controlling the rotor blade, the canard wing, the horizontal tail, rudders, lateral thrusters, and the plurality of elevons to maintain a stable flight path during the helicopter mode, the compound mode, and the fixed-wing mode.

7. The aircraft according to claim 6, wherein the control stick is a 3-axis controller and a single axis vertical controller or a 4-axis controller.

8. The aircraft according to claim 6, wherein the control stick provides control of the aircraft and maintains a stable flight path during the helicopter mode, the compound mode, and the fixed-wing mode without having a separate throttle lever and a separate collective control.

9. The aircraft according to claim 6, further comprising a velocity vector control system for maintaining a commanded velocity vector that is controlled by the rotor blade, the canard wing, the horizontal tail, the rudders, the lateral thrusters, and the plurality of elevons to maintain a stable flight path during the helicopter mode, the compound mode, and the fixed-wing mode.

10. The aircraft according to claim 9, wherein the commanded velocity vector is controlled to achieve the stable flight path.

11. The aircraft according to claim 9, wherein the commanded velocity vector is derived using acceleration commands received from the control stick that is used to manually control the aircraft in the helicopter mode, the compound mode, and the fixed-wing mode.

12. The aircraft according to claim 1, further comprising a velocity vector control system, coupled to the turbofan engine, for receiving a plurality of acceleration commands and a yaw axis rotation command and for generating a velocity vector command using the plurality of acceleration commands.

13. The aircraft according to claim 12, wherein the velocity vector command inherently prevents the aircraft from traveling beyond an envelope limit pertaining to acceleration or velocity.

14. The aircraft according to claim 12, wherein the velocity vector command, which is used to attain a reference flight path, is reduced automatically in proportion to the aircraft's approach to an envelope limit pertaining to acceleration or velocity.

15. The aircraft according to claim 12, wherein the velocity vector control system controls a plurality of control stick gradients if the aircraft approaches an envelope limit pertaining to acceleration or velocity.

16. The aircraft according to claim 12, wherein the plurality of acceleration commands and the yaw axis rotation command are received from a control stick that produces control stick commands.

17. The aircraft according to claim 16, wherein the velocity vector control system generates control gradients based on the aircraft's response to changes in the control stick commands and adjusts the control stick commands based on the control gradients to prevent the aircraft from traveling beyond the envelope limit pertaining to acceleration or velocity.

18. A method for scheduling canard positions and horizontal tail positions of a jet-powered tri-mode aircraft as a function of the speed of the aircraft to achieve smooth unloading of a rotor blade of the aircraft, the method comprising:
providing closed loop control of the pitch attitude using a pitch moment command having a low frequency component and a high frequency component;
providing open loop control of the horizontal tail position using the pitch moment command;
determining the horizontal tail position relative to its position limit; and
if the horizontal tail position is not approaching its position limit, then scheduling the elevon position using the high frequency component and scheduling the horizontal tail position using the sum of the open loop control and the low frequency component;
if the horizontal tail position is approaching its position limit, then scheduling the elevon position using a large portion of the low frequency component and the high frequency component and scheduling the horizontal tail position using a small portion of the low frequency component; and
if the horizontal tail position has reached its position limit, then scheduling the elevon position using the pitch moment command and scheduling the horizontal tail position to be fixed at its position limit.

19. The method according to claim 18, further comprising providing closed loop control of the pitch and roll attitude and directional controls and vertical acceleration controls using swashplate controls and blended elevon control for pitch and roll attitude blended differential lateral thrusters, and rudder control for aircraft yaw.

20. The method according to claim 19, wherein the swashplate controls include lateral and longitudinal cyclic and collective controls.

21. The method according to claim 18, wherein determining the horizontal tail position relative to its position limit includes sensing the position of the horizontal tail.

22. A method for scheduling, as a function of aircraft speed, the transition from a helicopter mode to a compound mode to a fixed-wing mode of a jet-powered tri-mode aircraft having a rotor blade, a mast valve, a cruise nozzle, a canard wing, and a horizontal tail, the method comprising:
scheduling a rotor speed reference as a function of aircraft speed;
scheduling the mast valve to open and the cruise nozzle to close in the helicopter mode;
scheduling the mast valve to gradually close and the cruise nozzle to gradually open in the compound mode; and
scheduling the mast valve to close, the cruise nozzle to open, and the tilt of the canard wing to gradually decrease in the fixed-wing mode.

23. The method according to claim 22, wherein the rotor speed reference is gradually reduced to about seventy percent at the conversion speed of the aircraft.

24. The method according to claim 22, further comprising modifying the schedule for the mast valve and the schedule for the cruise nozzle to improve the range of control for the rotor speed control or the forward speed control in the compound mode.

25. The method according to claim 22, further comprising determining an actual engine stall margin value from a fan pressure ratio and an engine mass flow.

26. The method according to claim 25, further comprising comparing the actual engine stall margin value to a desired stall margin value and scheduling the lateral thrusters to open if the actual engine stall margin is less than the desired stall margin, and scheduling the lateral thrusters to close if the actual engine stall margin is greater than the desired stall margin.

27. The method according to claim 26, further comprising increasing the desired stall margin value to avoid operating the engine in a condition that is vulnerable to power transients if an exhaust gas temperature is greater than a maximum desired value.

28. The method according to claim 22, further comprising scheduling closed loop control of the horizontal tail surface and elevons to minimize the need for swashplate controls thereby minimizing the flapping of the rotor blade.

29. A method for performing an automatic autorotation of a rotor blade of a jet-powered tri-mode aircraft in the event of an engine failure, the method comprising:
   setting a horizontal speed reference for the aircraft using modulation of pitch attitude;
   maintaining the rotor speed using collective position modulation;
   computing a flare altitude using an acceptable vertical acceleration; and
   setting a terminal vertical speed reference for the aircraft using the acceptable vertical acceleration.

30. The method according to claim 29, wherein the horizontal speed reference is set to about 60 knots.

31. The method according to claim 29, further comprising determining the acceptable vertical acceleration for a final rate of descent flare by increasing or decreasing the need for collective position modulation.

32. The method according to claim 31, further comprising inputting a forward deceleration command into a forward speed control loop to decrease the horizontal speed reference to approximately 0 when the altitude of the aircraft reaches 0.

33. The method according to claim 32, wherein the step of inputting the acceptable vertical acceleration into the vertical speed control loop is performed simultaneously with the step of inputting the forward deceleration command into the forward speed control loop to decrease the horizontal speed reference.

34. The method according to claim 29, wherein the vertical speed reference is set to about −1.0 feet per second.

35. The method according to claim 29, further comprising increasing the angle of attack of the aircraft as a result of the forward deceleration, thereby decreasing the rotor drag torque associated with the increased collective used for the vertical flare, thereby minimizing the decay in the vertical speed during the final flare.

36. The method according to claim 29, further comprising estimating the altitude of the aircraft above the ground using an inertial/GPS device and a radar device where the radar device becomes dominant when the altitude is below about 10 feet.

37. The method according to claim 36, wherein the radar device includes a filter for providing variable time constant inertial smoothing to accommodate for rough surface and radar altimeter noise.

38. The method according to claim 29, further comprising measuring a plurality of aircraft states and computing a plurality of predicted aircraft states as a function of aircraft maneuvers.

39. The method according to claim 38, wherein the plurality of aircraft states are selected from a group consisting of the horizontal speed reference of the aircraft, the vertical speed reference of the aircraft, and an altitude of the aircraft.

40. A method for stabilizing a jet-powered tri-mode aircraft as the jet-powered tri-mode aircraft travels in a compound mode, which is between a helicopter mode and a fixed-wing mode, the method comprising:
   receiving a plurality of velocity vector component values, a plurality of velocity vector commands, and a rotor speed reference value;
   generating a pitch attitude command and a roll attitude command using the plurality of velocity vector component values, the plurality of velocity vector commands, and the rotor speed reference value;
   generating a plurality of acceleration commands using the pitch attitude command and the roll attitude command and a plurality of vertical acceleration commands using a commanded array of waypoints or pilot control stick commands; and
   scheduling the rotor blade speed, a canard of the aircraft, and a horizontal tail of the aircraft as a function of a forward speed of the aircraft.

41. The method according to claim 40, wherein the plurality of velocity vector component values and velocity vector commands are derived from a plurality of pilot operated controllers.

42. The method according to claim 40, wherein the commanded array of waypoints are used for fully automated flights.

43. The method according to claim 40, wherein the plurality of velocity vector component values and velocity vector commands are derived from the commanded array of waypoints.

44. The method according to claim 40, wherein the rotor speed reference value is determined by the requirement that the aircraft lift be gradually transferred from the rotor blade to the aerodynamic surfaces.

45. A method for controlling the vertical flight path of a jet-powered tri-mode aircraft having a rotor blade, a mast valve, and a cruise nozzle as the jet-powered tri-mode aircraft travels in a compound mode, which is between a helicopter mode and a fixed-wing mode, the method comprising:
   generating a throttle command to control the forward speed of the aircraft;
   generating a collective command to control the rotor speed of the rotor blade; and
   generating pitch attitude and angle of attack commands to control the vertical flight path of the aircraft.

46. The method according to claim 45, wherein the throttle command, the collective command, and the pitch attitude command are integrated to provide a stable flight for the aircraft.

47. The method according to claim 45, wherein the collective command is generated via the rotor swashplate controls.

48. The method according to claim 45, wherein the coupling between rotor speed control, forward speed control and vertical flight path control is stabilized with frequency shaping compensators in the throttle control loop to maintain an optimum control bandwidth in these three interacting controls.

49. The method according to claim 45, further comprising modifying the mast valve position and the cruise nozzle position based on the throttle command, the collective command, the pitch attitude command, and the angle of attack command to provide an increased range of rotor speed control authority and hence an expanded aircraft flight envelope.

* * * * *